US012703272B2

(12) United States Patent
Guo et al.

(10) Patent No.: US 12,703,272 B2
(45) Date of Patent: Aug. 11, 2026

(54) BABY CARRIER WITH CONNECTING ASSEMBLY INCLUDING ENGAGING MEMBER AND ADAPTER

(71) Applicant: Wonderland Switzerland AG, Steinhausen (CH)

(72) Inventors: Zhengwen Guo, Steinhausen (CH); Yingzhong Chen, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 133 days.

(21) Appl. No.: 18/694,326

(22) PCT Filed: Sep. 21, 2022

(86) PCT No.: PCT/EP2022/076209
§ 371 (c)(1),
(2) Date: Mar. 21, 2024

(87) PCT Pub. No.: WO2023/046742
PCT Pub. Date: Mar. 30, 2023

(65) Prior Publication Data

US 2024/0399940 A1 Dec. 5, 2024

(30) Foreign Application Priority Data

Sep. 22, 2021 (CN) .......................... 202111109185.6

(51) Int. Cl.
*B60N 2/28* (2006.01)
*B62B 7/14* (2006.01)

(52) U.S. Cl.
CPC ......... *B60N 2/2842* (2013.01); *B60N 2/2821* (2013.01); *B62B 7/142* (2013.01)

(58) Field of Classification Search
CPC .. B60N 2/2842; B60N 2/2845; B60N 2/2848; B62B 7/14
See application file for complete search history.

(56) References Cited

U.S. PATENT DOCUMENTS 5,772,279 A 6/1998 Johnson, Jr.
8,556,344 B2 * 10/2013 Williams ............. B60N 2/2875 297/256.16

(Continued)

FOREIGN PATENT DOCUMENTS

CN 101731880 A 6/2010
CN 203318198 U 12/2013

(Continued)

OTHER PUBLICATIONS

ASTM International, F2194-16, StandardConsumer Safety Specification for Bassinets and Cradles, Jun. 28, 2016 https://compass.astm.org/content-access?contentCode=ASTM%7CF2194-16%7Cen-US (Year: 2016).*

(Continued)

*Primary Examiner* — Arfan Y. Sinaki
(74) *Attorney, Agent, or Firm* — Volpe Koenig

(57) ABSTRACT

A baby carrier and a manufacturing method thereof are disclosed. The baby carrier includes a main body formed with a carrying receptacle configured to carry a baby and having a receptacle wall. The baby carrier further includes a connecting assembly fixed on the receptacle wall. The receptacle wall includes side walls and a bottom wall. The connecting assembly includes: an engaging member fixed on an outer surface of the bottom wall and configured to engage with a child safety seat; and an adapter fixed on an outer surface of a wall of the side walls and configured to engage with a stroller.

20 Claims, 24 Drawing Sheets

(56) References Cited

U.S. PATENT DOCUMENTS

| | | | | |
|---|---|---|---|---|
| 8,919,809 | B2 | 12/2014 | Li | |
| 9,676,303 | B2 * | 6/2017 | Hou | B60N 2/2845 |
| 10,369,906 | B2 * | 8/2019 | Gay | B60N 2/2887 |
| 10,596,931 | B2 | 3/2020 | Yan et al. | |
| 12,059,984 | B2 * | 8/2024 | Chen | A47D 13/025 |
| 2010/0117416 | A1 | 5/2010 | Cheng | |
| 2015/0108801 | A1 * | 4/2015 | Hou | B60N 2/2821 297/256.16 |
| 2015/0375641 | A1 | 12/2015 | van Mourik et al. | |
| 2018/0050614 | A1 * | 2/2018 | Gay | B60N 2/2845 |
| 2022/0194271 | A1 * | 6/2022 | Mason | B60N 2/26 |
| 2023/0182625 | A1 * | 6/2023 | Chen | B62B 7/145 297/250.1 |
| 2023/0182626 | A1 * | 6/2023 | Chen | B60N 2/2845 297/250.1 |

FOREIGN PATENT DOCUMENTS

| | | | |
|---|---|---|---|
| CN | 103501659 | A | 1/2014 |
| CN | 207754914 | U | 8/2018 |
| CN | 108944588 | A | 12/2018 |
| CN | 109475238 | A | 3/2019 |
| CN | 109843643 | A | 6/2019 |
| CN | 210101727 | U | 2/2020 |
| CN | 212047017 | U | 12/2020 |
| CN | 213262058 | U | 5/2021 |
| CN | 109532584 | B | 6/2021 |
| DE | 4220685 | A1 | 1/1994 |
| EP | 2272734 | A2 | 1/2011 |
| GB | 2511124 | A | 8/2014 |
| JP | 2002-205586 | A | 7/2002 |
| JP | 2014-133548 | A | 7/2014 |
| JP | 2016-55862 | A | 4/2016 |
| JP | 2017-47058 | A | 3/2017 |
| TW | 200626350 | A | 1/1994 |
| TW | 202214155 | A | 4/2022 |
| WO | 2012104575 | A1 | 8/2012 |
| WO | 2017077127 | A1 | 5/2017 |
| WO | 2017103122 | A1 | 6/2017 |
| WO | 2018007243 | A1 | 1/2018 |
| WO | 2021229051 | A1 | 11/2021 |

OTHER PUBLICATIONS

"Second Office Action Issued in Corresponding Taiwanese Patent Application No. 112150744", Mailed Date: Jan. 8, 2025, 10 pages.
Office Action issued in corresponding Taiwanese Application No. 112150744 dated Aug. 2, 2024.
Office Action issued in corresponding Taiwanese Application No. 111135738 dated Jun. 20, 2023. English Summary Included.
Office Action issued in corresponding Taiwanese Application No. 111135738 dated Mar. 4, 2024. English Summary Included.
International Search Report and Written Opinion for Application No. PCT/EP2022/076209 dated Jan. 31, 2023.
Canadian Office Action for corresponding Canadian Application No. 3233063 dated Aug. 8, 2025, 4 pages.
Office Action dated Jun. 6, 2025 in corresponding TW Application No. 112150744, and translation thereof.
"First Office Action Issued in Corresponding Chinese Patent Application No. 202210289410.7", Mailed Date: Mar. 26, 2025, 59 pages.
"First Office Action Issued in Corresponding Japanese Patent Application No. 2024-518231", Mailed Date: Jul. 8, 2025, 16 pages.

* cited by examiner

BABY CARRIER WITH CONNECTING ASSEMBLY INCLUDING ENGAGING MEMBER AND ADAPTER

CROSS-REFERENCE TO RELATED APPLICATIONS

This application is a national phase application under 35 U.S.C. § 371 of PCT International Application No. PCT/EP2022/076209, which has an international filing date of Sep. 21, 2022 and claims priority of Chinese Patent Application No. 202111109185.6, which has a filing date of Sep. 22, 2021. The contents of the above identified PCT International Application and Chinese Patent Application are hereby incorporated in their entireties by reference for all purposes.

TECHNICAL FIELD

The present disclosure relates to the technical field of baby carriers, and in particular to a baby carrier and a manufacturing method thereof.

BACKGROUND

A baby carrier, such as an infant car seat or a carrycot, generally includes a rigid plastic body and a foam material body provided on the plastic. The rigid plastic body is generally produced by injection molding of a thermoplastic material, and the foam material body is generally formed by foaming on a surface of the rigid plastic body. The overall weight of the baby carrier manufactured in this way is heavier, and it is more difficult for the user to move such baby carrier, which leads to a bad user experience.

SUMMARY

According to some embodiments, a baby carrier and a manufacturing method thereof are provided.

A baby carrier includes a main body is formed with a carrying receptacle configured to carry a baby. The main body is made of a foam material.

In one of the embodiments, the baby carrier further includes a connecting assembly. The carrying receptacle has a receptacle wall, and the connecting assembly is fixed on the receptacle wall.

In one of the embodiments, the connecting assembly includes an engaging member. The receptacle wall includes side walls and a bottom wall. The engaging member has an engaging rod. The engaging rod is fixed on an outer surface of the bottom wall, and configured to engage with a child safety seat.

In one of the embodiments, the connecting assembly further includes an adapter fixed on an outer surface of the side wall, and the adapter is configured to engage with a stroller.

In one of the embodiments, the baby carrier is a carrycot. The engaging member further includes a connecting rod connected to the engaging rod, and an end of the connecting rod away from the engaging rod is fixed on the adapter.

In one of the embodiments, the connecting rod and the engaging rod are arranged at an included angle, and the connecting rod extends along a direction from the bottom wall to an opening of the carrying receptacle.

In one of the embodiments, the baby carrier further includes a reinforcing member. Two engaging members are provided. The engaging rods of the two engaging members are parallel and spaced apart from each other, and two ends of the reinforcing member are connected to the two engaging rods respectively.

In one of the embodiments, two adapters are provided. The two adapters are fixed on the outer surfaces of two opposite side walls of the side walls respectively, and ends of the connecting rods of the two engaging members away from the corresponding engaging rods are fixed on the two adapters respectively.

In one of the embodiments, the reinforcing member includes a first reinforcing rod. Two ends of the first reinforcing rod are connected to ends of the two engaging rods away from the corresponding connecting rods respectively.

In one of the embodiments, the first reinforcing rod and the two engaging rods are integrally formed.

In one of the embodiments, the reinforcing member further includes a second reinforcing rod. Two ends of the second reinforcing rod are connected to the engaging rods of the two engaging members respectively, and the second reinforcing rod and the first reinforcing rod are spaced apart from each other.

In one of the embodiments, the second reinforcing rod is a flat rod.

In one of the embodiments, at least two second reinforcing rods are provided, and the at least two second reinforcing rods are arranged spaced apart from each other along an extending direction of the engaging rod.

In one of the embodiments, an included angle between an inner surface of the bottom wall 113 and a horizontal plane is less than or equal to 10°.

In one of the embodiments, the baby carrier is an infant car seat. The bottom wall includes a first support portion and a second support portion that are connected to each other. The first support portion and the second support portion are arranged at a first included angle.

In one of the embodiments, the first included angle is in a range from 90° to 135°.

In one of the embodiments, a rounded transition is formed between the first support portion and the second support portion.

In one of the embodiments, both an outer surface of the first support portion and an outer surface of the second support portion are provided with the engaging rod.

In one of the embodiments, the baby carrier further includes a handle. Two ends of the handle are fixed on two opposite side walls of the side walls respectively.

In one of the embodiments, the baby carrier further includes a fixing member disposed on the connecting assembly and abutting against a receptacle wall of the carrying receptacle.

In one of the embodiments, a foam expansion ratio of the main body is in a range from 30 to 50.

A manufacturing method of a baby carrier includes: providing a mold in which a connecting assembly is placed; and injecting a foam material into a mould cavity of the mold to foam, so as to enable the foam material to form a main body in the mold, the connecting assembly being fixed on the main body.

In one of the embodiments, in the step of injecting the foaming material into the mould cavity of the mold to foam, a foam expansion ratio is in a range from 30 to 50.

A baby carrier includes a main body is formed with a carrying receptacle configured to carry a baby. The main body is made of a plastic material.

In one of the embodiments, the baby carrier further includes a connecting assembly. The carrying receptacle has a receptacle wall, and the connecting assembly is fixed on the receptacle wall.

In one of the embodiments, the baby carrier further includes a flexible cover covering the main body.

In one of the embodiments, the flexible cover is a fabric.

In one of the embodiments, the baby carrier further includes a buffer filler filled between the flexible cover and the main body.

In one of the embodiments, the baby carrier is a carrycot. The receptacle wall includes side walls and a bottom wall. The bottom wall has a head support portion, a back support portion and a hip support portion. The buffer filler is filled between the flexible cover and the head support portion, between the flexible cover and the back support portion, and between the flexible cover and the hip support portion.

In one of the embodiments, an included angle between an inner surface of the bottom wall and a horizontal plane is less than or equal to 10°.

In one of the embodiments, the baby carrier further includes a handle. Two ends of the handle are fixed on two opposite side walls of the side walls respectively.

In one of the embodiments, the baby carrier is an infant car seat. The receptacle wall includes side walls and a bottom wall. The bottom wall includes a first support portion and a second support portion that are connected to each other, and the first support portion and the second support portion are arranged at a first included angle.

In one of the embodiments, the first included angle is in a range from 90° to 135°.

In one of the embodiments, a rounded transition is formed between the first support portion and the second support portion.

In one of the embodiments, the cavity wall includes side walls and a bottom wall that are connected to each other. The engaging member is fixed on an outer surface of the bottom wall, and configured to engage with a base of the child safety seat.

In one of the embodiments, the connecting assembly further includes an adapter fixed on an outer surface of the side wall, and the adapter is configured to be connected to a stroller.

In one of the embodiments, two adapters are provided, and the two adapters are fixed on the outer surfaces of two opposite side walls of the side walls respectively.

In one of the embodiments, the baby carrier further includes a handle. Two ends of the handle are fixed on two opposite side walls of the side walls respectively.

In one of the embodiments, the receptacle wall has a thickness in a range from 1.5 to 1.8 mm.

A manufacturing method of a baby carrier includes: providing a first mold in which a connecting assembly is placed; and injecting molten plastic into a mould cavity of the first mold to enable the molten plastic to cover the connecting assembly to form a main body, such that the connecting assembly is embedded and fixed in the main body.

A baby carrier, which is a carrycot, includes a first main body and a second main body. The first main body and/or the second main body are formed with a carrying receptacle configured to carry a baby. The second main body is molded on the first main body. The first main body is made of a plastic material. The second main body is made of a foam material. If a sum of a volume of the first main body and a volume of the second main body is represented by V1, and the volume of the second main body is V2, V2/V1 is in a range from 0.89 to 0.99.

In one of the embodiments, the carrycot further includes a connecting assembly. The carrying receptacle has a receptacle wall, and the connecting assembly is fixed on the receptacle wall.

In one of the embodiments, the connecting assembly includes an engaging rod. The receptacle wall includes side walls and a bottom wall. The engaging rod is fixed on an outer surface of the bottom wall, and configured to engage with a child safety seat.

In one of the embodiments, the connecting assembly further includes an adapter fixed on an outer surface of the side wall, and the adapter is configured to engage with a stroller.

In one of the embodiments, an included angle between an inner surface of the bottom wall and a horizontal plane is less than or equal to 10°.

In one of the embodiments, the baby carrier further includes a handle. Two ends of the handle are fixed on two opposite side walls of the side walls respectively.

In one of the embodiments, the second main body has a foam expansion ratio in a range from 30 to 50.

A baby carrier, which is an infant car seat, includes a first main body and a second main body. The first main body and/or the second main body are formed with a carrying receptacle configured to carry a baby. The first main body is made of a plastic material. The second main body is made of a foam material. The second main body is molded on the first main body. If a sum of a volume of the first main body and a volume of the second main body is represented by V1, and the volume of the second main body is represented by V2, V2/V1 is in a ranger from 0.8 to 0.9.

In one of the embodiments, the carrycot further includes a connecting assembly. The carrying receptacle has a receptacle wall, and the connecting assembly is fixed on the receptacle wall.

In one of the embodiments, the connecting assembly includes an engaging rod. The receptacle wall includes side walls and a bottom wall. The engaging rod is fixed on an outer surface of the bottom wall, and configured to engage with a child safety seat.

In one of the embodiments, the connecting assembly further includes an adapter fixed on an outer surface of the side wall, and the adapter is configured to engage with a stroller.

In one of the embodiments, the bottom wall includes a first support portion and a second support portion that are connected to each other, and the first support portion and the second support portion are arranged at a first included angle.

In one of the embodiments, the first included angle is in a range from 90° to 135°.

In one of the embodiments, a rounded transition is formed between the first support portion and the second support portion.

In one of the embodiments, the baby carrier further includes a handle. Two ends of the handle are fixed on two opposite side walls of the side walls respectively.

In one of the embodiments, the second main body has a foam expansion ratio in a range from 30 to 50.

A manufacturing method of a baby carrier is provided. The baby carrier is a carrycot, and the manufacturing method includes: providing a first mold, and injecting a thermoplastic plastic into a mould cavity of the first mold to form a first main body; and providing a second mold, placing the first main body into a mould cavity of the second mold, and injecting a foam material into the mould cavity of the second mold to foam, such that the foam material is molded on the first main body to form a second main body, and if a sum of a volume of the first main body and a volume of the second main body is represented by V1, and the volume of the second main body is represented by V2, V2/V1 is in a range from 0.89 to 0.99.

In one of the embodiments, in the step of injecting the foaming material into the mould cavity of the mold to foam, a foam expansion ratio is in a range from 30 to 50.

A manufacturing method of a baby carrier is provided. The baby carrier is an infant car seat, and the manufacturing method includes: providing a first mold, and injecting a thermoplastic plastic into a mould cavity of the mold to form a first main body; and providing a second mold, placing the first main body into a mould cavity of the second mold, and injecting a foam material into the mould cavity of the second mold to foam, such that the foam material is molded on the first main body to form a second main body, and if a sum of a volume of the first main body and a volume of the second main body is represented by V1, and the volume of the second main body is represented by V2, V2/V1 is in a range from 0.8 to 0.9.

In one of the embodiments, in the step of injecting the foaming material into the mould cavity of the mold to foam, a foam expansion ratio is in a range from 30 to 50.

The advantages and spirit of the present disclosure can be further understood from the following detailed description of the invention and the accompanying drawings.

BRIEF DESCRIPTION OF THE DRAWINGS

In order to illustrate the technical solutions of the embodiments of the present disclosure more clearly, the accompanying drawings required in the embodiments of the present disclosure will be briefly introduced below. Obviously, the drawings described below are only some embodiments of the present disclosure, and for those of ordinary skill in the art, other drawings can also be obtained from these drawings without creative effort.

DESCRIPTION OF REFERENCE NUMERALS

Figure 1:
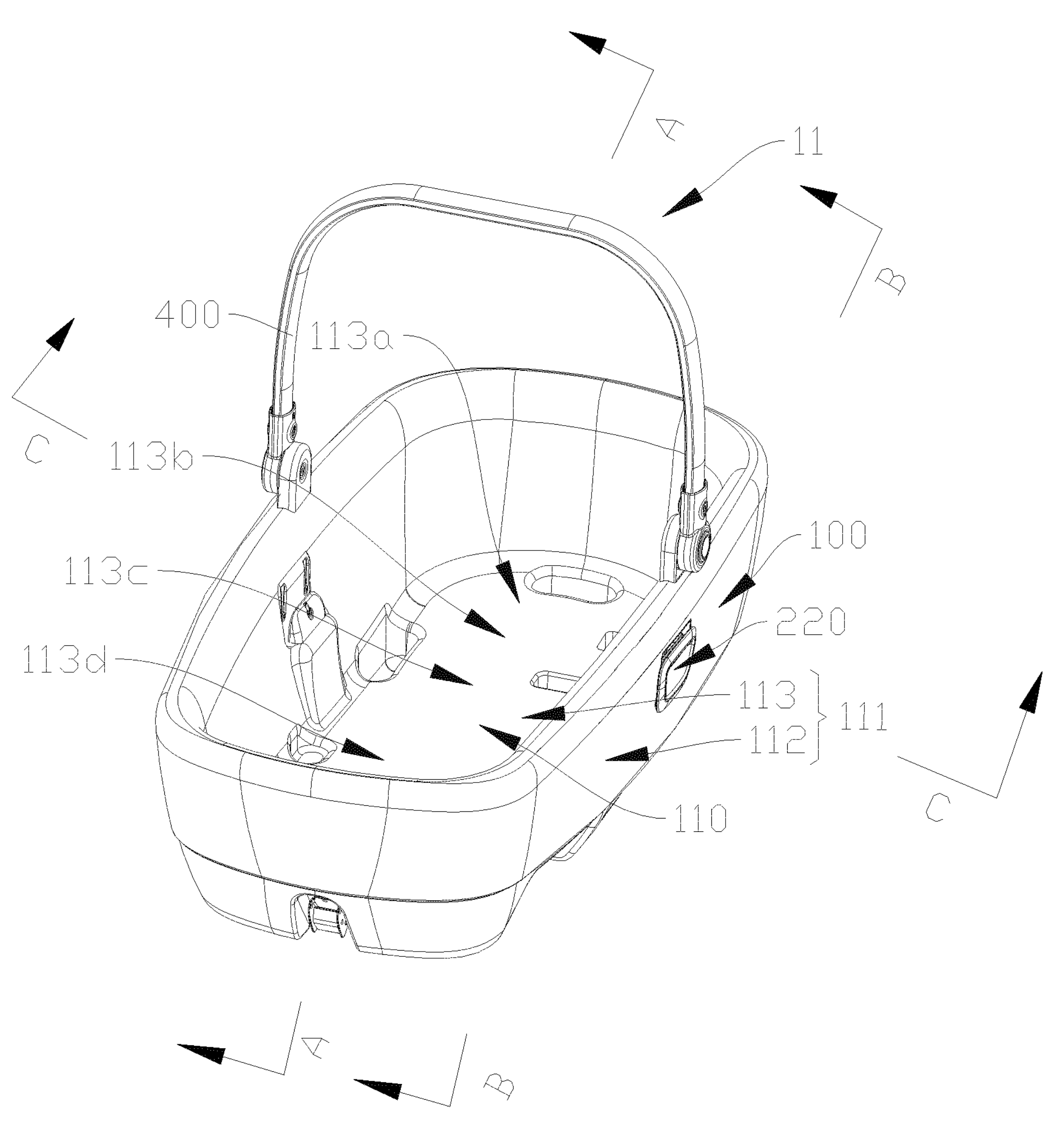
FIG. 1 is a perspective view illustrating a baby carrier according to an embodiment of the present disclosure, where the baby carrier is a carrycot.
Figure 2:
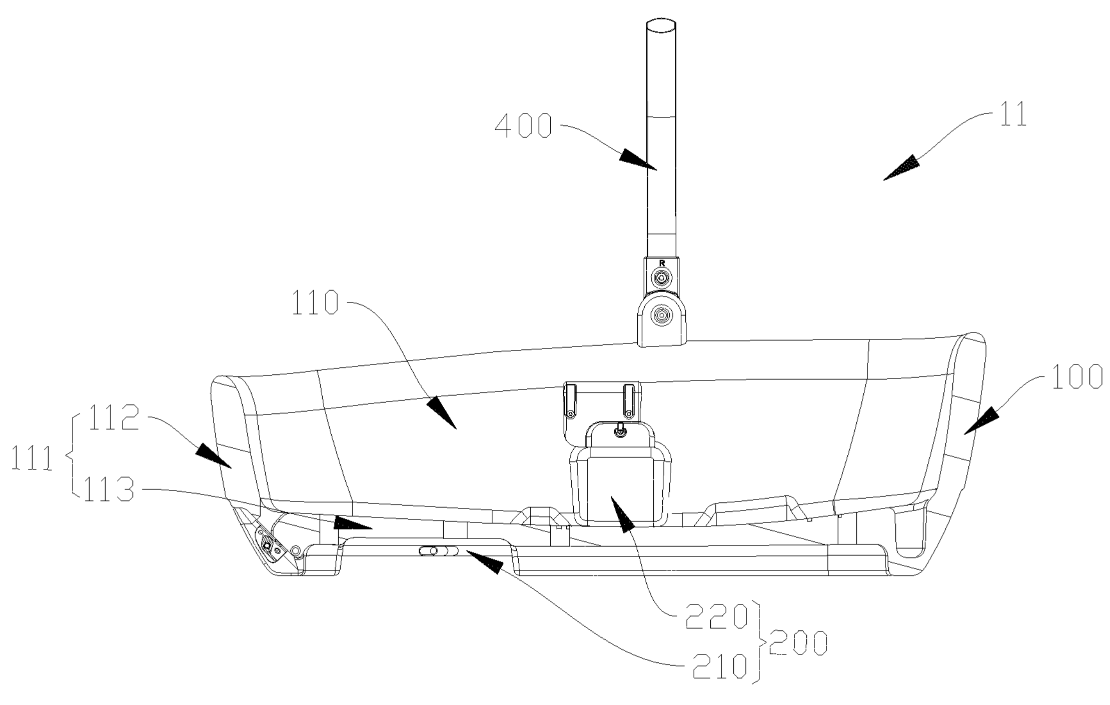
FIG. 2 is a sectional view along line A-A shown in FIG. 1.

11: carrycot, 12: infant car seat, 100: main body, 101: first main body, 102: second main body, 110: carrying receptacle, 111: receptacle wall, 112: side wall, 113: bottom wall, 113*a*: head support portion, 113*b*: back support portion, 113*c*: hip support portion, 113*d*: leg support portion, 113*e*: first support portion, 113*f*: second support portion, 200: connecting assembly, 210: engaging member, 211: engaging rod, 212: connecting rod, 220: adapter, 221: adapter body, 222: release button, 300: reinforcing member, 310: first reinforcing rod, 320: second reinforcing rod, 400: handle, 500: fastener, 20: base.

DETAILED DESCRIPTION OF THE EMBODIMENTS

In order to make the objectives, technical solutions and advantages of the present disclosure clearer, the present disclosure will be further described in detail below with reference to the accompanying drawings and specific embodiments. It should be understood that the specific embodiments described herein are only used to explain the present disclosure, and do not limit the protection scope of the present disclosure.

It should be understood that when an element is defined as "fixed to" another element, it is either directly on an element or indirectly on an element with a mediating element. When an element is considered to be "connected to" another element, it can be directly connected to another element or indirectly connected to another element with an mediating element. The terms "vertical", "horizontal", "left", "right", and the like used herein are for illustrative purposes only and are not intended to be the only embodiment.

All technical and scientific terms used herein have the same meaning as commonly understood by skilled person in the art to which the present disclosure belongs, unless otherwise defined. The terms used in the specification of the present invention herein are for the purpose of describing specific examples only and are not intended to restrict the present invention. The term "and/or" used herein includes any and all combinations of one or more of the associated listed objects.

The present disclosure provides a baby carrier, which can be, for example, a carrycot 11 or an infant car seat 12. The baby carrier may be configured to carry a baby and is suitable for being fixed on a child safety seat or a stroller. The production, processing and assembly process of the baby carrier is simple and efficient, and an overall weight of the baby carrier is light and the baby carrier is easy to be moved.

As shown in FIGS. 1 to 9, in one embodiment, the baby carrier includes a main body 100, a connecting assembly 200, a reinforcing member 300, a fixing member (not shown in the drawings) and a handle 400.

As shown in FIG. 1, the baby carrier is a carrycot 11. The main body 100 encloses a space for forming a carrying receptacle 110 configured to carry a baby, and the carrying receptacle 110 is substantially a rectangular cavity. The carrying receptacle 110 has a receptacle wall 111, and the receptacle wall 111 includes four connected side walls 112 and a bottom wall 113 connected to the side walls 112. The bottom wall 113 includes a head support portion 113*a*, a back support portion 113*b*, a hip support portion 113*c* and a leg support portion 113*d* in sequence along a length direction of the bottom wall 113, which are configured to support the baby's head, back, hip and legs, respectively. The widths of the back support portion 113*b* and the hip support portion 113*c* each are greater than the width of the head support portion 113*a*, and the widths of the back support portion 113*b* and the hip support portion 113*c* each are greater than the width of the leg support portion 113*d*, that is, the bottom wall 113 forms a structure with narrow ends and a wide middle to fit the body structure of the baby whose shoulders and crotch are wider, making the baby more comfortable. In an alternative embodiment, the entire main body 100 may also be made into a structure that is narrow at both ends and wide in the middle, which can ensure a sufficient strength on the one hand, and facilitate processing and molding and reduce costs on the other hand. The shape of the main body 100 may be altered according to actual needs, and is not limited thereto. An inner surface of the bottom wall 113 may be arranged horizontally, such that the baby can lie flat in the carrycot 11, thus the function of the carrycot 11 is more stable, and also the baby will have a larger stretching space in the carrycot 11, which is beneficial for the baby to stretch and sleep in the carrycot 11. In another embodiment, the inner surface of the bottom wall 113 may also be oblique to a certain extent, with an oblique angle not greater than 10°. In other words, an included angle between the inner surface of the bottom wall 113 and a horizontal plane is less than or equal to 10°.

Optionally, the main body 100 may be covered with a layer of flexible cover (not shown in the drawings), such as a fabric, to improve the comfort of the baby carrier. The connecting assembly 200 is fixed on the receptacle wall 111.

The main body 100 is made of a foam material, and the foam expansion ratio may be in a range from 30 to 50. In this embodiment, the foam material is foamed polypropylene (EPP). In other embodiments, the foam material may also be foamed polystyrene (EPS), foamed polystyrene-polyethylene mixture (EPO), foamed polyethylene (EPE), etc. The main body 100 of the baby carrier is made of the foam material as a whole. Compared with a conventional composite structure of rigid plastic and soft foam, the main body 100 is lighter in weight and is convenient for a user to move. Since the main body 100 is only made of the foam material, the production, processing and assembly processes are also greatly simplified, thereby improving the production, processing and assembly efficiency of the baby carrier.

Figure 3:
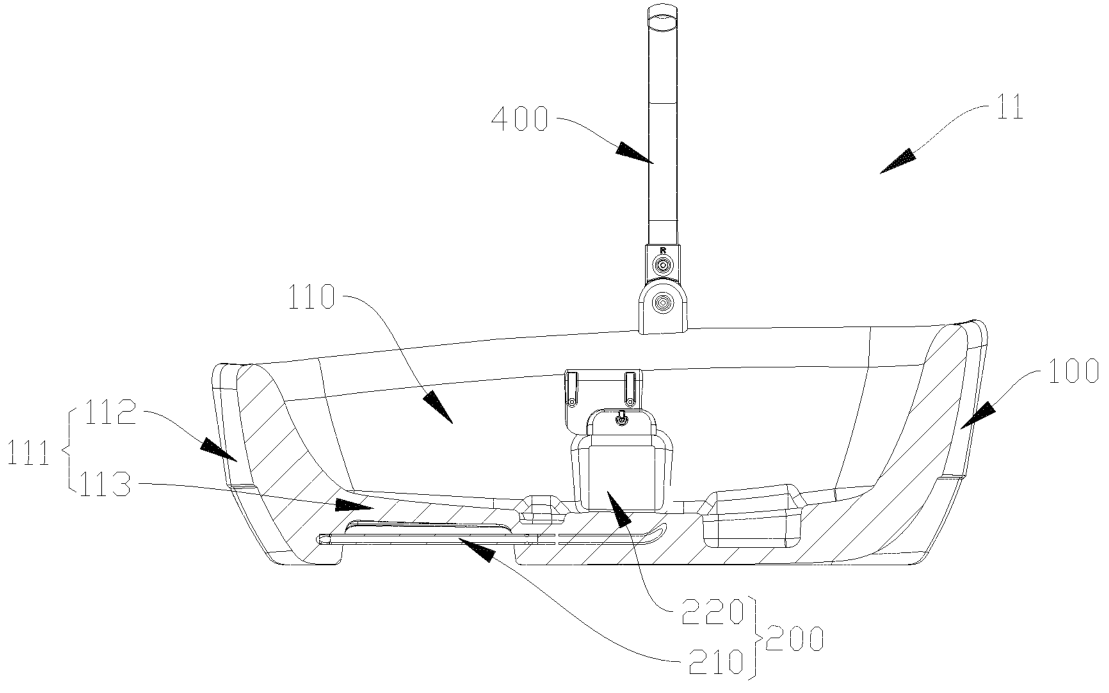
FIG. 3 is a sectional view along line B-B shown in FIG. 1.
Figure 4:
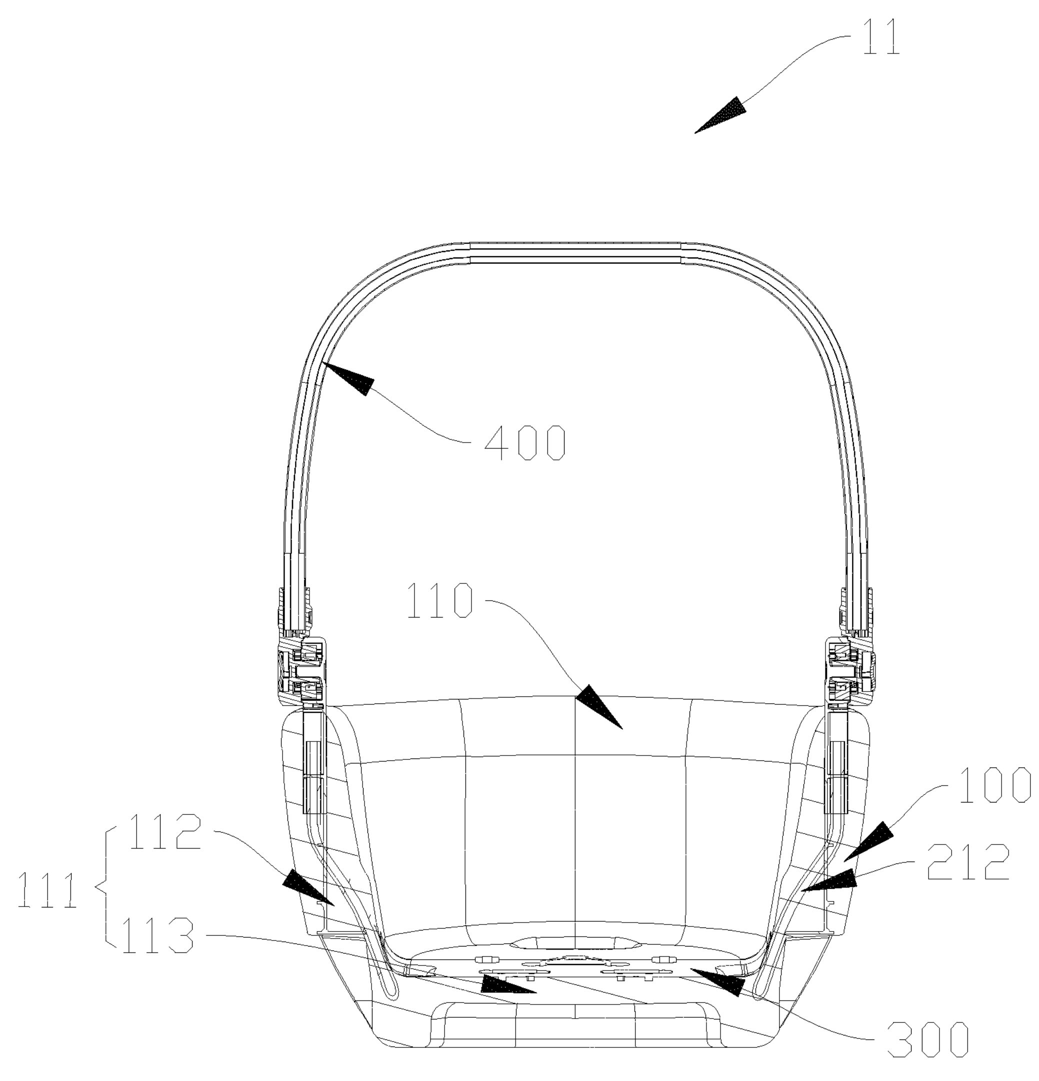
FIG. 4 is a sectional view along line C-C shown in FIG. 1.

Specifically, as shown in FIG. 3, the connecting assembly 200 includes an engaging member 210 and an adapter 220. The baby carrier may be engaged with and fixed on a child safety seat by the engaging member 210, or fixed on a stroller by the adapter 220, thereby expanding the applicable scene of the baby carrier and improving the universality of the baby carrier.

Figure 5:
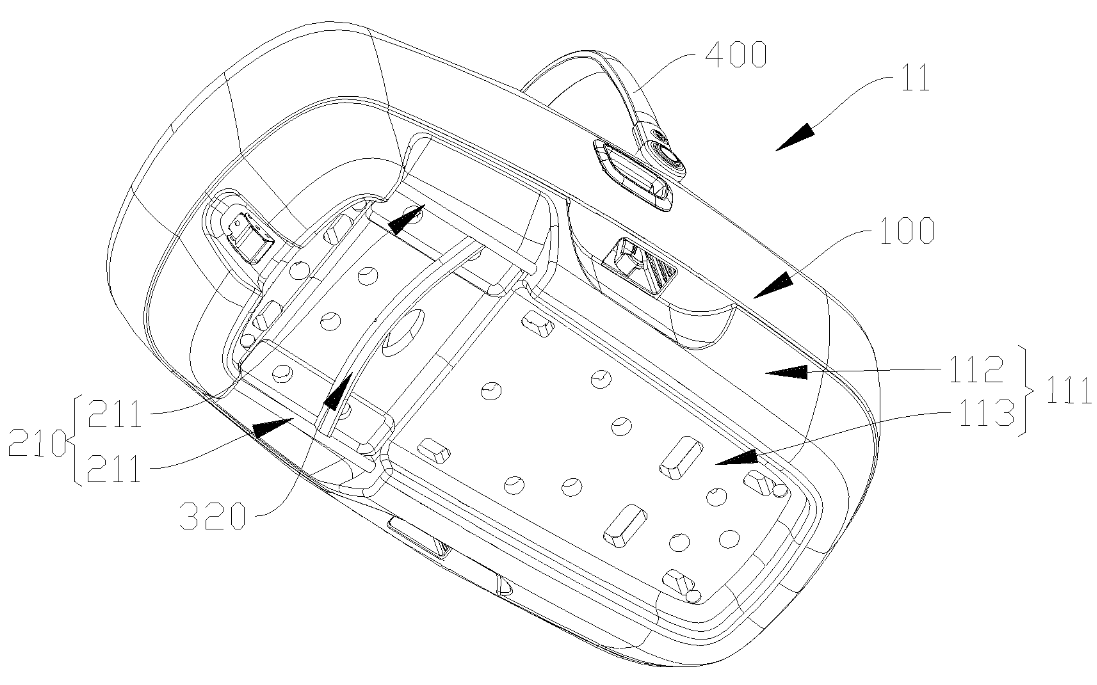
FIG. 5 is a perspective view illustrating the baby carrier shown in FIG. 1 in another perspective.
Figure 6:
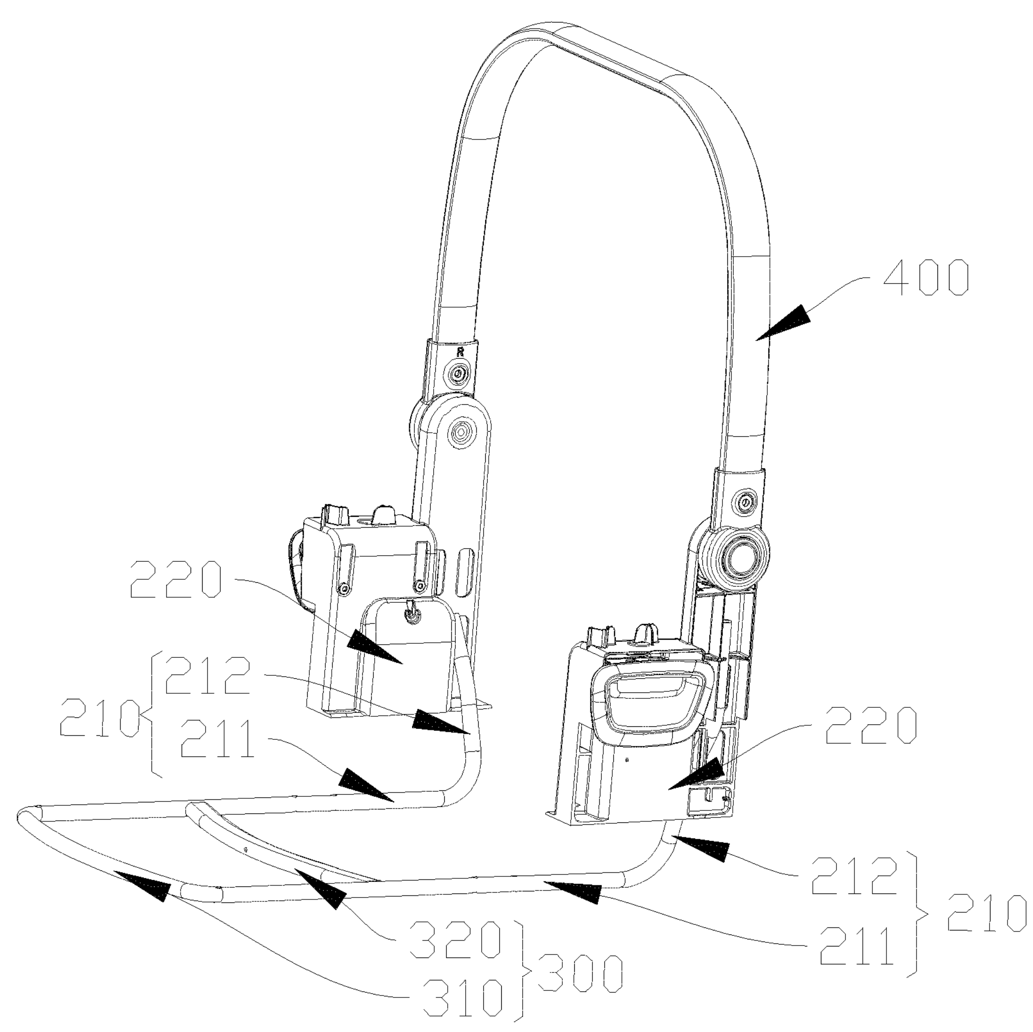
FIG. 6 is a perspective view illustrating the baby carrier shown in FIG. 1, where a main body is omitted.

Specifically, as shown in FIGS. 5 and 6, the engaging member 210 includes an engaging rod 211 and a connecting rod 212. In this embodiment, the engaging rod 211 and the connecting rod 212 are both rods with circular cross-sections. In other embodiments, the engaging rod 211 and the connecting rod 212 may also be rods of other shapes. In this embodiment, the engaging rod 211 and the connecting rod 212 are arranged at an included angle, for example, the engaging rod 211 and the connecting rod 212 may be perpendicular to each other. The engaging rod 211 is fixed on an outer surface of the bottom wall 113. For example, both ends of the engaging rod 211 may be embedded in the bottom wall 113, and a middle portion of the connecting rod 212 is exposed on the outer surface of the bottom wall 113, so as to engage with the base 20 (shown in FIG. 20) of the child safety seat. The connecting rod 212 is fixed on the side wall 112, for example, the connecting rod 212 may be embedded in the side wall 112. The connecting rod 212 extends along a direction from a bottom wall 113 toward an opening of the carrying receptacle 110. In this embodiment, one end of the engaging rod 211 is connected to one end of the connecting rod 212. The engaging rod 211 and the connecting rod 212 are integrally formed, which is convenient for molding and increases the structural strength. In other embodiments, the engaging rod 211 and the connecting rod 212 may not be connected.

In this embodiment, the engaging rod 211 and the connecting rod 212 are both metal rods, so as to increase a structural strength of the main body 100. In other embodiments, the engaging rod 211 and the connecting rod 212 may also be made of other materials.

Figure 20:
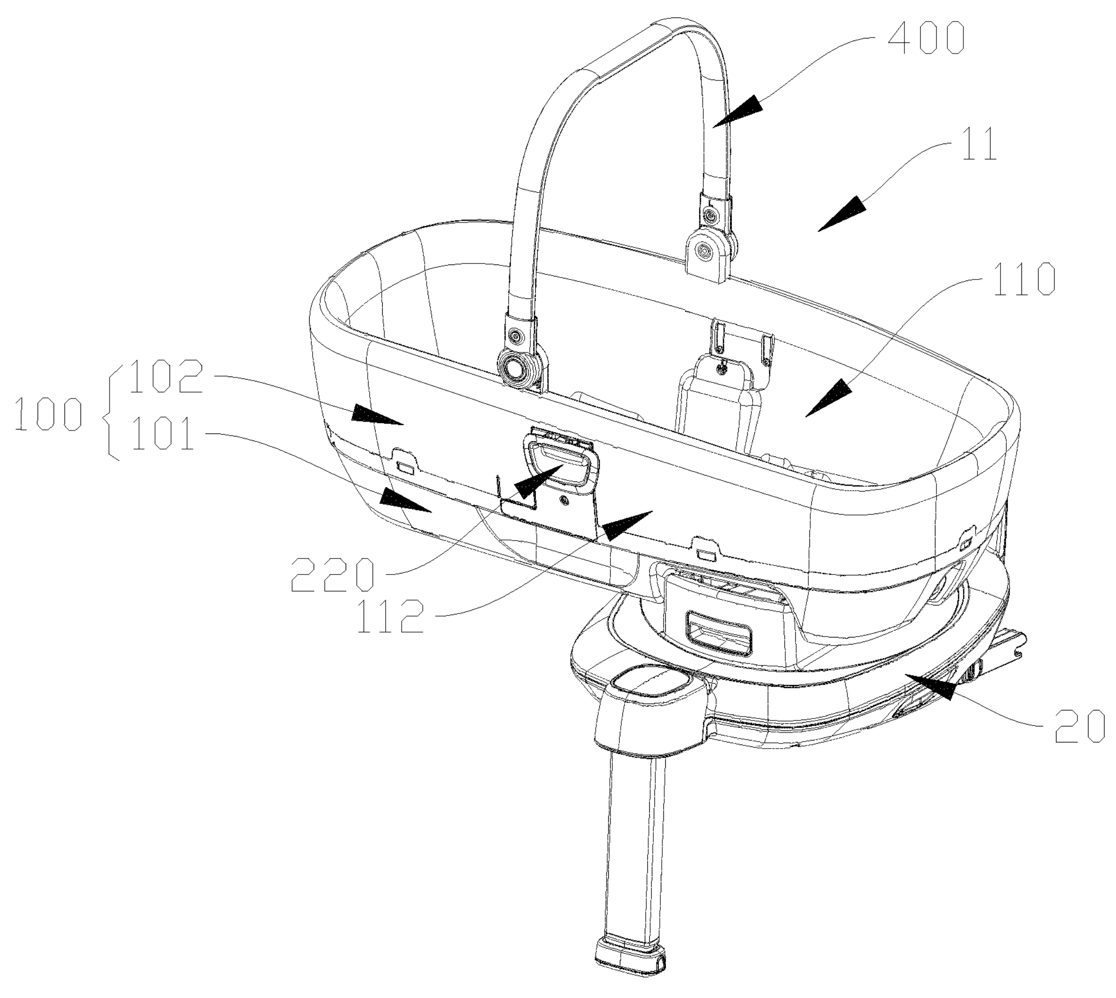
FIG. 20 is a perspective view illustrating the baby carrier shown in FIG. 16 being installed on a base of the child safety seat.

Optionally, as shown in FIGS. 1 and 6, there are at least two engaging members 210, and the at least two engaging members 210 are arranged in parallel and spaced apart. In this embodiment, there are two engaging members 210. In other embodiments, the number of the engaging members 210 may be less than two or more than two. As shown in FIG. 20, the carrycot 11 is generally laterally engaged with and positioned on the base 20 of the child safety seat, and a direction of the impact subjected by the carrycot 11 is along a left-right direction of the carrycot 11, such that the two engaging rods 211 of the two engaging members 210 each are arranged along the length direction of the bottom wall 113, and such that the two engaging rods 211 of the two engaging members 210 are arranged in parallel and spaced apart along the width direction of the bottom wall 113. There are two adapters 220 correspondingly, and the two adapters 220 are fixed on outer surfaces of two opposite side walls of the side walls 112, respectively. In this embodiment, the two adapters 220 are fixed on the outer surfaces of the two side walls 112 connected to two length sides of the bottom wall 113, ends of the two connecting rods 212 away from the corresponding engaging rods 211 are connected and fixed to the two adapters 220 respectively. In this way, the engaging rod 211, the connecting rod 212 and the adapter 220 are connected to each other to form a whole, which can further improve the structural strength of the baby carrier. Optionally, the adapter 220 includes an adapter body 221 and a release button 222 (not shown in FIGS. 1 and 6, but may refer to the infant car seat 12 shown in FIG. 7). The adapter body 221 is configured to be engaged with a frame of the stroller, and the release button 222 is operable to release the adapter body 221 from the stroller.

Further, as shown in FIGS. 5 and 6, two ends of the reinforcing member 300 are connected to the two engaging members 210 respectively to further improve a structural strength of the baby carrier. Specifically, the reinforcing member 300 includes a first reinforcing rod 310 and a second reinforcing rod 320. Both the first reinforcing rod 310 and the second reinforcing rod 320 are metal rods to ensure structural strength. In other embodiments, the first reinforcing rod 310 and the second reinforcing rod 320 may also be made of other materials.

As shown in FIG. 6, two ends of the first reinforcing rod 310 are connected to ends of the two engaging rods 211 away from the corresponding connecting rods 212 respectively. In this way, ends of the two engaging rods 211 are connected via the first reinforcing rod 310, and other ends of the two engaging rods 211 are connected to the two adapters 220 via the two connecting rods 212 respectively.

As shown in FIGS. 5 and 6, both ends of the second reinforcing rod 320 are connected to the engaging rods 211 of the two engaging members 210 respectively, and the second reinforcing rod 320 and the first reinforcing rod 310 are spaced apart from each other. In this embodiment, the first reinforcing rod 310 and the second reinforcing rod 320 are arranged in parallel and spaced apart along a direction perpendicular to the engaging rod 211. Both ends of the second reinforcing rod 320 may be connected to the middle portions of the two engaging rods 211 respectively, or may be connected to connections between the two engaging rods 211 and the corresponding connecting rods 212 respectively. In this embodiment, there is one second reinforcing rod 320. In other embodiments, there may be more than one second reinforcing rod 320, which can be adjusted according to actual needs. In this embodiment, the second reinforcing rod 320 is a flat rod with a rectangular or oval cross-section, so as to facilitate welding with the two engaging rods 211 with circular cross-sections, and a welded portion has a large contact area, such that the connections by welding of the two engaging rods 211 and the second reinforcing rod 320 will not be easy to be disjointed. In this way, the engaging rod 211, the connecting rod 212, the adapter 220, the first reinforcing rod 310 and the second reinforcing rod 320 form a frame structure supporting the main body 100, which is capable of ensuring that the entire baby carrier has a strong structural strength.

In this embodiment, the engaging rod 211, the connecting rod 212, the adapter 220, the first reinforcing rod 310 and the second reinforcing rod 320 are connected by welding. In other embodiments, the engaging rod 211, the connecting rod 212, the adapter 220, the first reinforcing rod 310 and the second reinforcing rod 320 may also be integrally formed.

Further, the fixing member is disposed on the engaging member 210 and abuts against the receptacle wall 111 to enhance the connection strength between the engaging member 210 and the main body 100. The fixing member may be disposed on the adapter 220 and abut against the receptacle wall 111 to enhance the connection strength between the main body 100 and the adapter 220. In this embodiment, the fixing member may be a fixing pad. In other embodiments, the fixing member may also be in other forms.

Further, as shown in FIG. 1, two ends of the handle 400 are fixed on the two opposite side walls 112 respectively. In this embodiment, the two ends of the handle 400 are fixed on the two side walls 112 connected to length sides of the bottom wall 113, which is convenient for the user to lift the baby carrier. The handle 400 may be, for example, an annular webbing sewn on the fabric, or a cloth cover sewn on the fabric, and a soft or hard lifting loop may be provided in the cloth cover.

Figure 7:
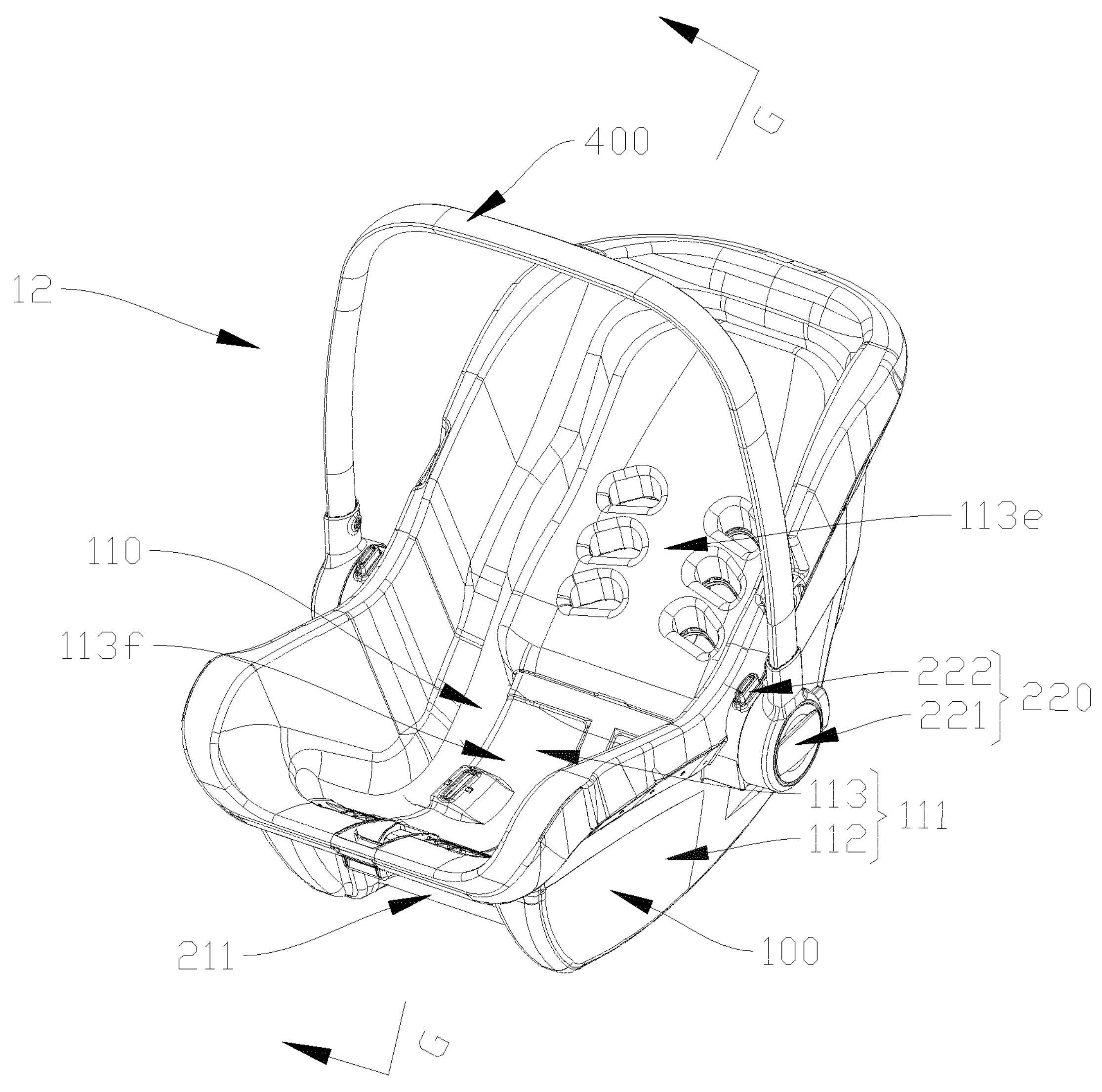
FIG. 7 is a perspective view illustrating a baby carrier according to an embodiment of the present disclosure, where the baby carrier is an infant car seat.
Figure 8:
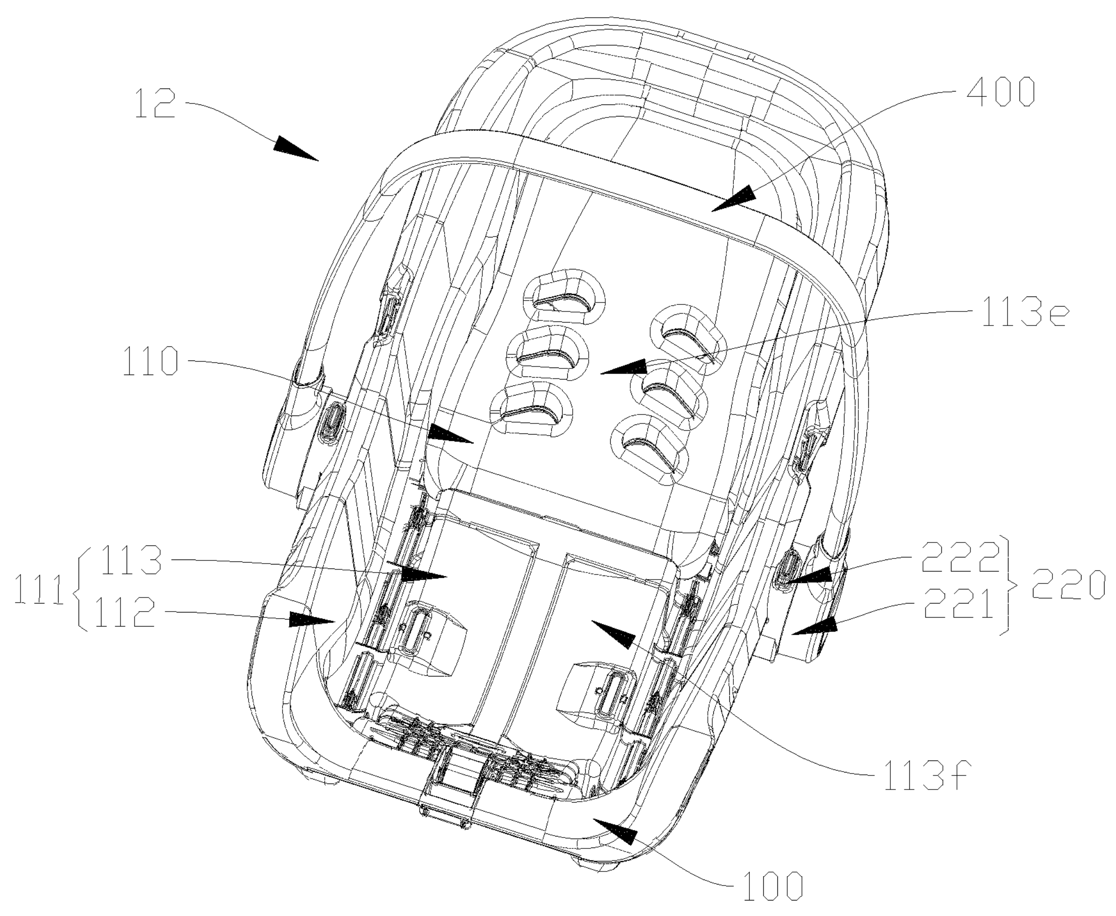
FIG. 8 is a perspective view illustrating the baby carrier shown in FIG. 7 in another perspective.
Figure 9:
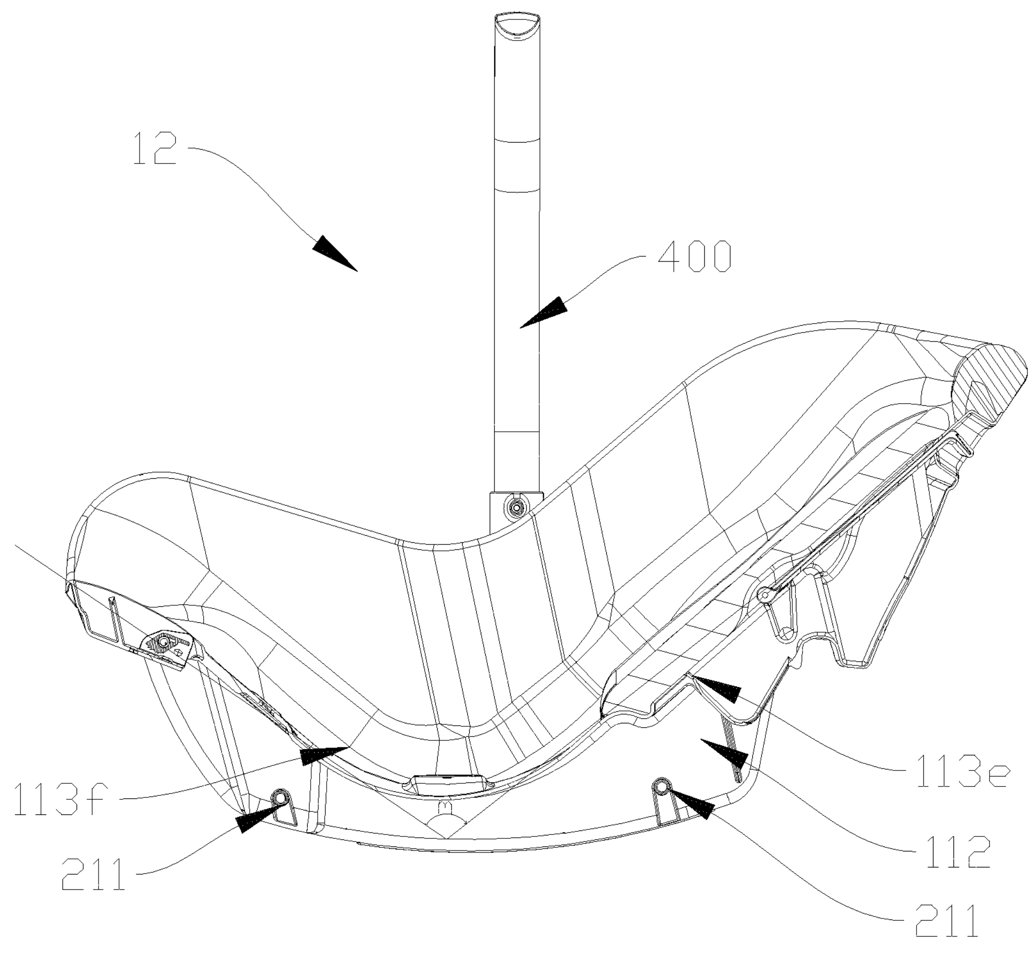
FIG. 9 is a sectional view along line G-G shown in FIG. 7.
Figure 27:
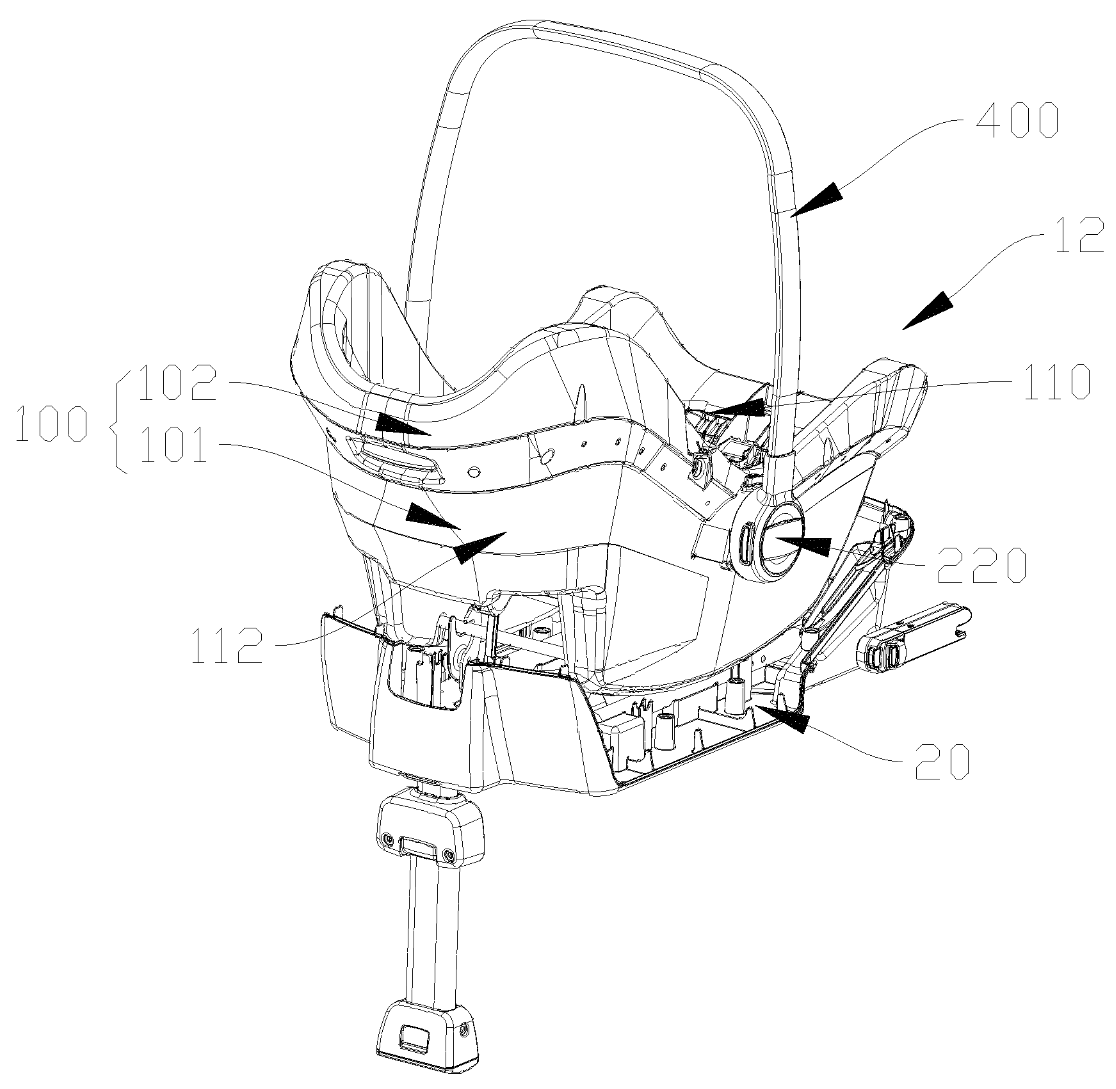
FIG. 27 is a perspective view illustrating the baby carrier shown in FIG. 21 being installed on a base of the child safety seat.

As shown in FIGS. 7 to 9, the baby carrier may also be an infant car seat 12. The infant car seat 12 has a structure substantially the same as the carrycot 11, except that the bottom wall 113 of the infant car seat 12 includes a first support portion **113*e* and a second support portion 113*f* which are connected to each other and are arranged at a first included angle m, such that the baby can be in a sitting or half-lying position in the infant car seat 12. Optionally, the angle range of the first included angle m is from 90° to 135°, and in this embodiment, the first included angle m is 99°. A rounded transition is formed between the first support portion 113*e* and the second support portion 113*f* to match a shape of the baby's hip. In this way, a wrapping structure can be formed for the baby, such that the baby can be well protected, thereby providing a good impact resistance and improving the safety performance, and the baby will not be curled too much, making the baby more comfortable. In addition, outer surfaces of the first support portion 113*e* and the second support portion 113*f* are provided with engaging rods 211, and the engaging rods 211 are disposed along a width direction of the first support portion 113*e* and a width direction of the second support portion 113*f* respectively. As shown in FIG. 27, the infant car seat 12 is generally engaged with and positioned on a base 20 of the child safety seat in a forward direction, that is, arranged longitudinally and in a direction parallel to a driving direction of a vehicle. A direction of the stress subjected by the infant car seat 12 is along the front-rear direction of the infant car seat 12, Therefore, the engaging rods 211 are arranged along a width direction of the first support portion 113*e* and a width direction of the second support portion 113*f*** respectively.

The present disclosure also provides a manufacturing method for making the aforementioned baby carrier, including the following steps.

In step S101, a mold is provided in which a connecting assembly 200 is placed.

In step S102, a foam material is injected into a mould cavity of the mold to foam, so as to enable the foam material to form a main body in the mold. The connecting assembly is fixed on the main body.

The baby carrier manufactured by the aforementioned manufacturing method is lighter and easier to move than the conventional composite structure made of rigid plastic and soft foam material because the whole baby carrier is made of the foam material. The whole manufacturing process is simple, and the molding is completed in one procedure. After molding, the connecting assembly 200 is directly fixed on the main body 100, which can greatly improve the manufacturing efficiency and reduce the time and the labor cost.

Optionally, a foam expansion ratio in step S102 is in a range from 30 to 50.

As shown in FIGS. 10 to 15, in another embodiment, the baby carrier includes a main body 100, a connecting assembly 200, a flexible cover (not shown in the drawings) and a buffer filler (not shown in the drawings).

Figure 10:
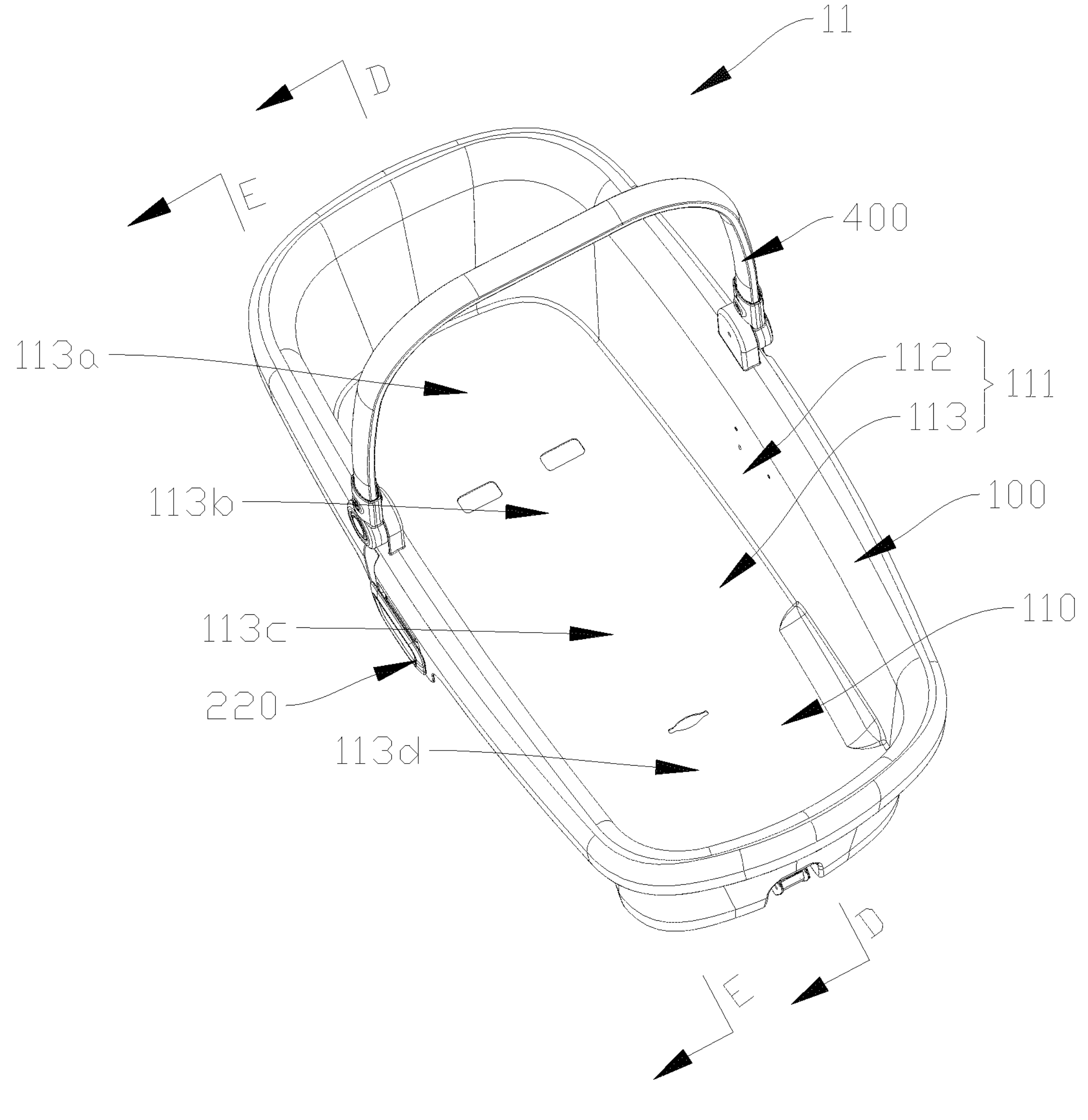
FIG. 10 is a perspective view illustrating a baby carrier according to another embodiment of the present disclosure, where the baby carrier is a carrycot.
Figure 11:
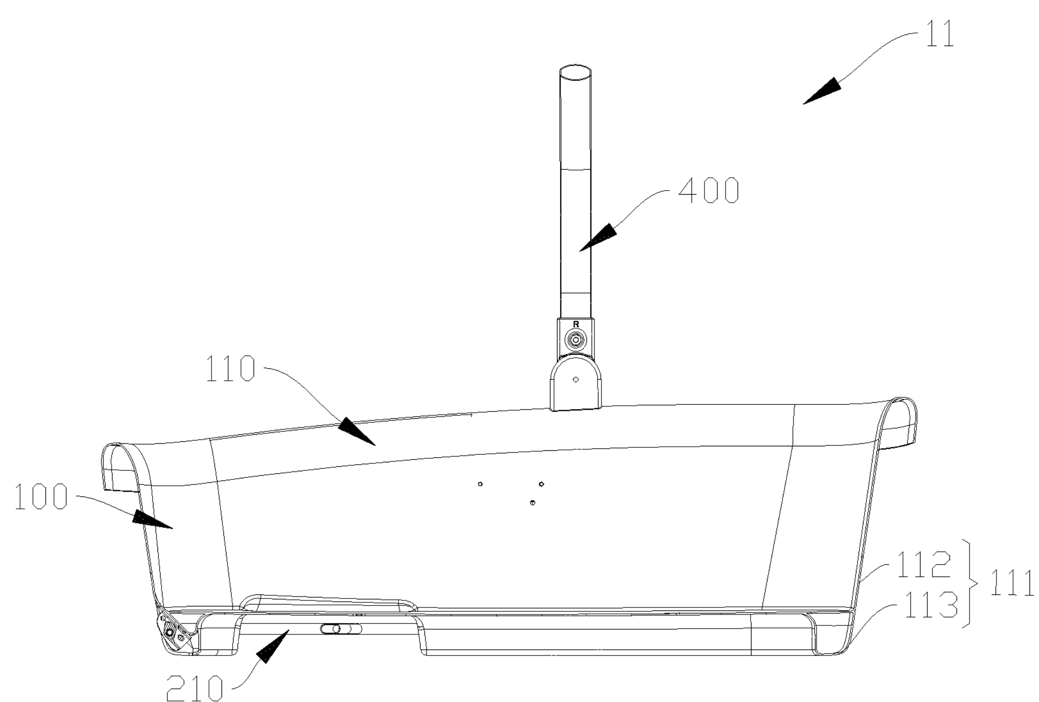
FIG. 11 is a sectional view along line D-D shown in FIG. 10.

As shown in FIG. 10, the baby carrier may be a carrycot 11. The main body 100 encloses a space for forming a carrying receptacle 110 configured to carry a baby, and the carrying receptacle 110 is substantially a rectangular cavity. The carrying receptacle 110 has a receptacle wall 111, and the receptacle wall 111 includes four connected side walls 112 and a bottom wall 113 connected to the side walls 112. The bottom wall 113 includes a head support portion 113*a*, a back support portion 113*b*, a hip support portion 113*c* and a leg support portion 113*d* in sequence along a length direction of the bottom wall 113, which are configured to support the baby's head, back, hip and legs, respectively. The widths of the back support portion 113*b* and the hip support portion 113*c* each are greater than widths of the head support portion 113*a*, the widths of the back support portion 113*b* and the hip support portion 113*c* each are greater than the width of the leg support portion 113*d*, that is, the bottom wall 113 forms a structure with narrow ends and a wide middle to fit the body structure of the baby whose shoulders and crotch are wider, making the baby more comfortable. In an alternative embodiment, the entire main body 100 may also be made into a structure that is narrow at both ends and wide in the middle, which can ensure a sufficient strength on the one hand, and facilitate processing and molding and reduce costs on the other hand. The shape of the main body 100 may be altered according to actual needs, and is not limited thereto. The connecting assembly 200 is fixed on the receptacle wall 111. An inner surface of the bottom wall 113 may be arranged horizontally, such that the baby can lie flat in the carrycot 11, thus the function of the carrycot 11 is more stable, and also the baby will have a larger stretching space in the carrycot 11, which is beneficial for the baby to stretch and sleep in the carrycot 11. The inner surface of the bottom wall 113 may also be oblique to a certain extent, with an oblique angle not greater than 10°. In other words, an included angle between the inner surface of the bottom wall 113 and a horizontal plane is less than or equal to 10°.

The main body 100 is made of a plastic material. In this embodiment, the plastic material is polypropylene (PP). In other embodiments, the plastic material may also be of other types. The main body 100 of the baby carrier is made of the plastic material as a whole. Compared with the conventional composite structure of rigid plastic and soft foam, the main body 100 is lighter in weight and is convenient for a user to move. Since the main body 100 is only made of the plastic material, the production, processing and assembly processes are also greatly simplified, thereby improving the production, processing and assembly efficiency of the baby carrier.

Optionally, a thickness of the receptacle wall 111 is in a range from 1.5 to 1.8 mm. In this embodiment, the thickness of the receptacle wall 111 is 1.6 mm, which is a minimum thickness that can ensure that the main body 100 has sufficient structural strength, thereby not only achieving a maximum light weight of the baby carrier to facilitate the movement of the baby carrier, but also greatly simplifying a structure of the baby carrier, which is convenient for production and processing and reduces the manufacturing cost.

Further, the flexible cover covers the main body 100 in the outside to improve the buffer protection effect and comfort of the baby carrier. In this embodiment, the flexible cover is a fabric that integrally covers the outer surface of the main body 100. The buffer filler is filled between the flexible cover and the main body 100 to further improve the buffer protection effect and comfort of the baby carrier. In this embodiment, the buffer filler is filled between the flexible cover and the head support portion 113*a*, between the flexible cover and the back support portion 113*b*, and between the flexible cover and the hip support portion 113*c*. According to a physical structure of the baby, in the baby carrier, the main stress-subjected positions are generally concentrated on the head support portion 113*a*, the back support portion 113*b* and the hip support portion 113*c*, while the leg support portion 113*d* is generally not subjected to too much stress. Therefore, the buffer filler is arranged on the head support portion 113*a*, the back support portion 113*b* and the hip support portion 113*c*, and the buffer filler is not arranged on the leg support portion 113*d*, so as to save the manufacturing cost and reduce the weight of the baby carrier on the premise of ensuring that the baby in the baby carrier receives sufficient buffer protection. The buffer fillers may also be provided on the entire outer surface of the main body 100 or the entire inner side of the receptacle wall 111 according to actual needs, which is not limited thereto.

Figure 13:
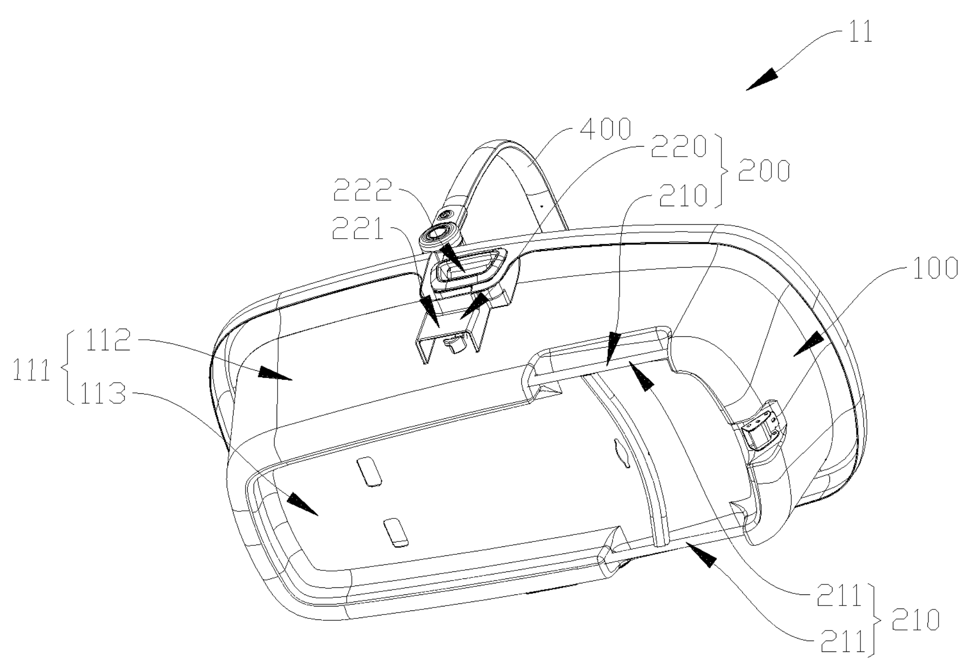
FIG. 13 is a perspective view illustrating the baby carrier shown in FIG. 10 in another perspective.

Specifically, as shown in FIG. 13, the connecting assembly 200 includes an engaging member 210 and an adapter 220. The engaging member 210 is fixed on the outer surface of the bottom wall 113, and is configured to engage with the base 20 (shown in FIG. 20) of the child safety seat. The adapter 220 is fixed on the outer surface of the side wall 112, and configured to engage with the stroller. In this way, the applicable scene of the baby carrier is expanded and the universality of the baby carrier is improved.

Figure 12:
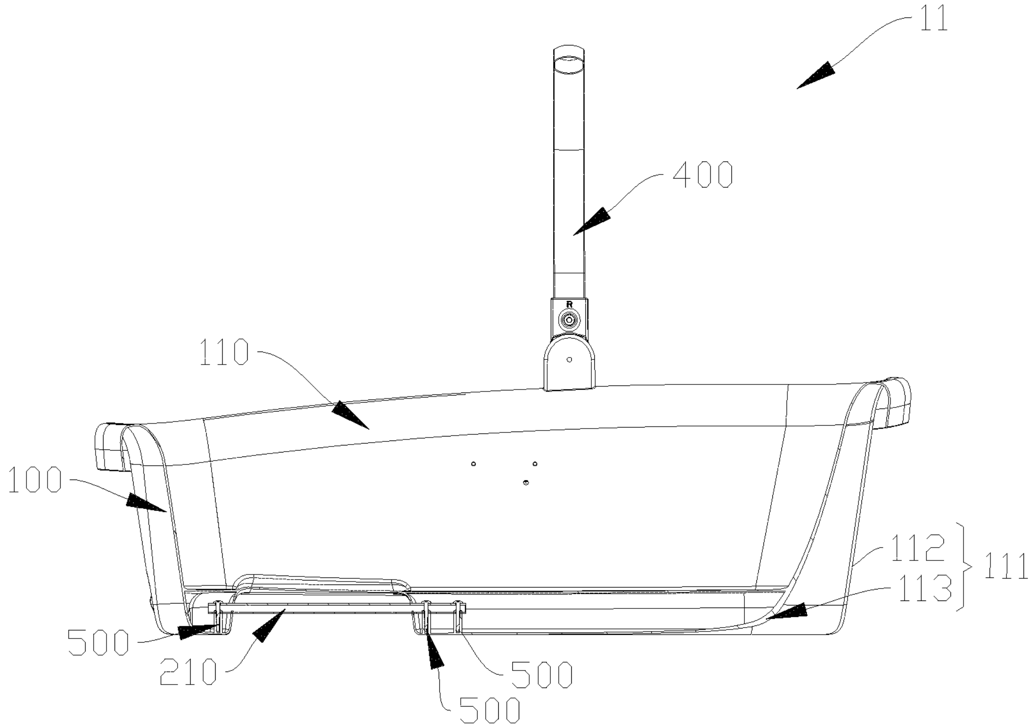
FIG. 12 is a sectional view along line E-E shown in FIG. 10.

Further, as shown in FIG. 13, the engaging member 210 includes two engaging rods 211, and the two engaging rods 211 are arranged parallel to each other and spaced apart. As shown in FIG. 20, the carrycot 11 is generally laterally engaged with and positioned on the base 20 of the child safety seat, and a direction of the impact subjected by the carrycot 11 is along a left-right direction of the carrycot 11, such that the two engaging rods 211 of the two engaging members 210 each are arranged along the length direction of the bottom wall 113, and such that the two engaging rods 211 of the two engaging members 210 are arranged in parallel and spaced apart along the width direction of the bottom wall 113. In this embodiment, as shown in FIG. 12, both ends of the engaging rod 211 are fixed to the bottom wall 113 by fasteners 500. There are two adapters 220, and the two adapters 220 are fixed on the outer surfaces of the two opposite side walls 112 respectively. Of course, in other embodiments, the number and arrangement of the engaging rods 211 and the adapters 220 can also be adjusted according to the actual situation. Optionally, the adapter 220 includes an adapter body 221 and a release button 222. The adapter body 221 is configured to be engaged with a frame of the stroller, and the release button 222 is operable to release the adapter body 221 from the stroller.

Further, as shown in FIGS. 10 and 13, two ends of the handle 400 are fixed on the two opposite side walls 112 respectively. In this embodiment, the two ends of the handle 400 are fixed on the two side walls 112 connected to length sides of the bottom wall 113, which is convenient for the user to lift the baby carrier. The handle 400 may be, for example, an annular webbing sewn on the fabric, or a cloth cover sewn on the fabric, and a soft or hard lifting loop may be provided in the cloth cover.

Figure 14:
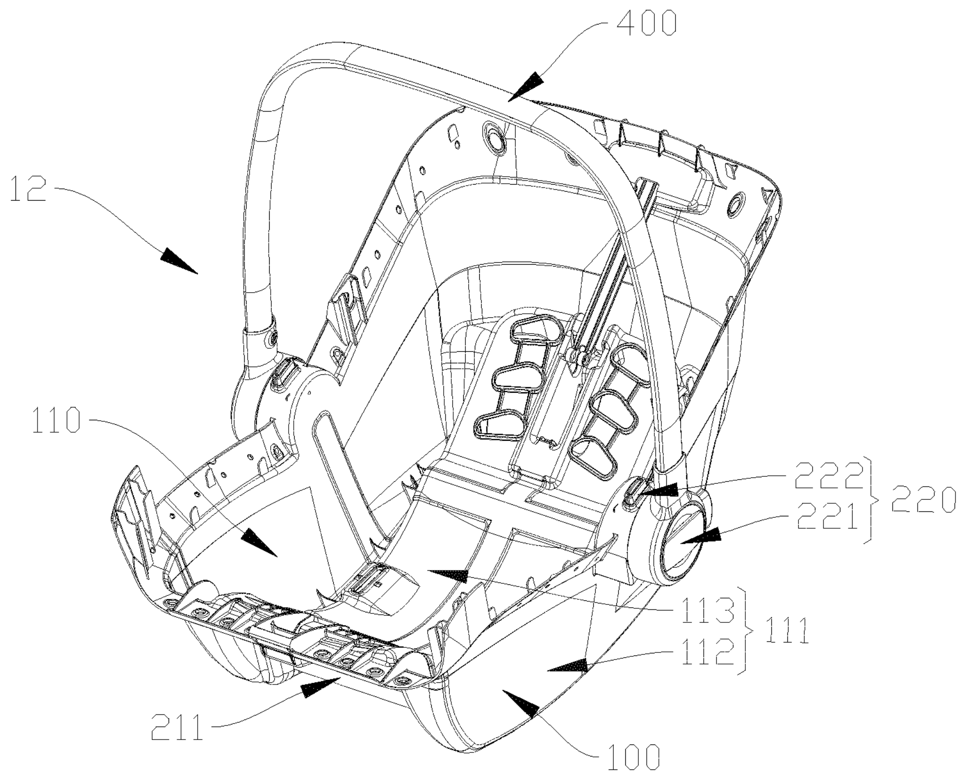
FIG. 14 is a perspective view illustrating a baby carrier according to another embodiment of the present disclosure, where the baby carrier is an infant car seat.
Figure 15:
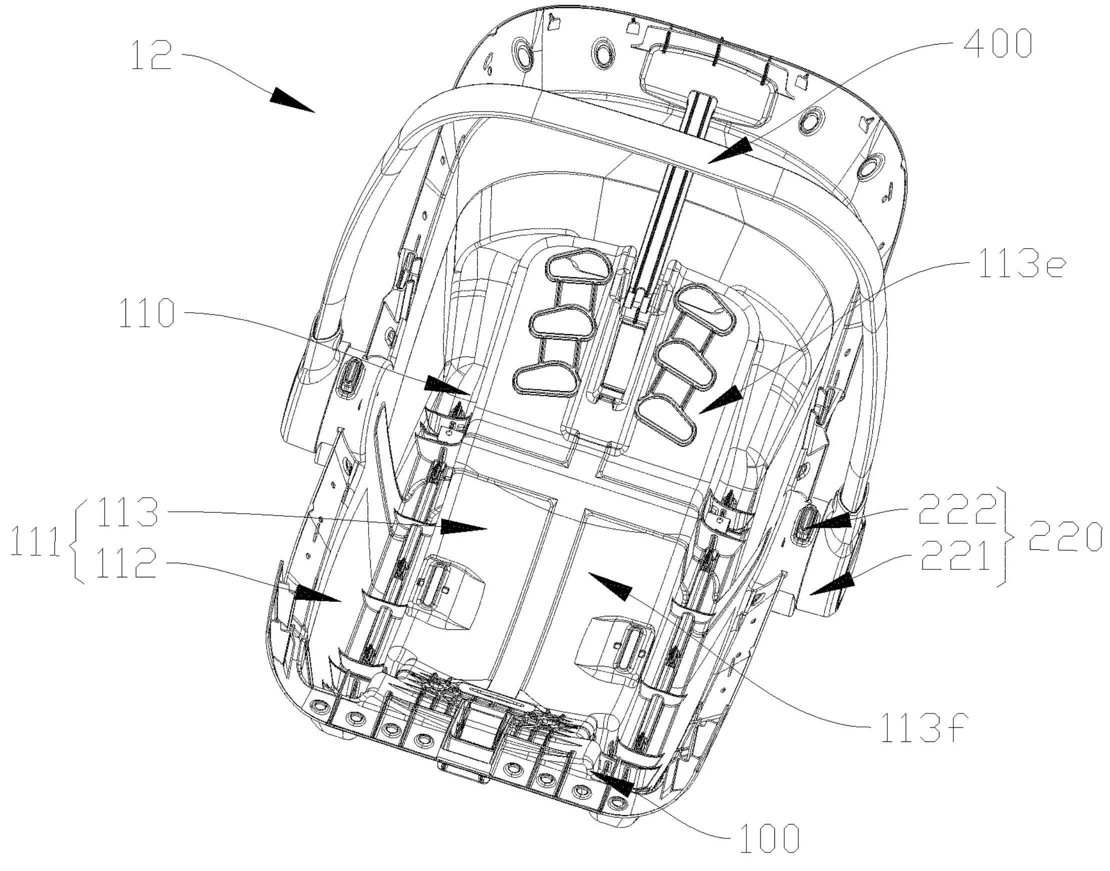
FIG. 15 is a perspective view illustrating the baby carrier shown in FIG. 14 in another perspective.
Figure 16:
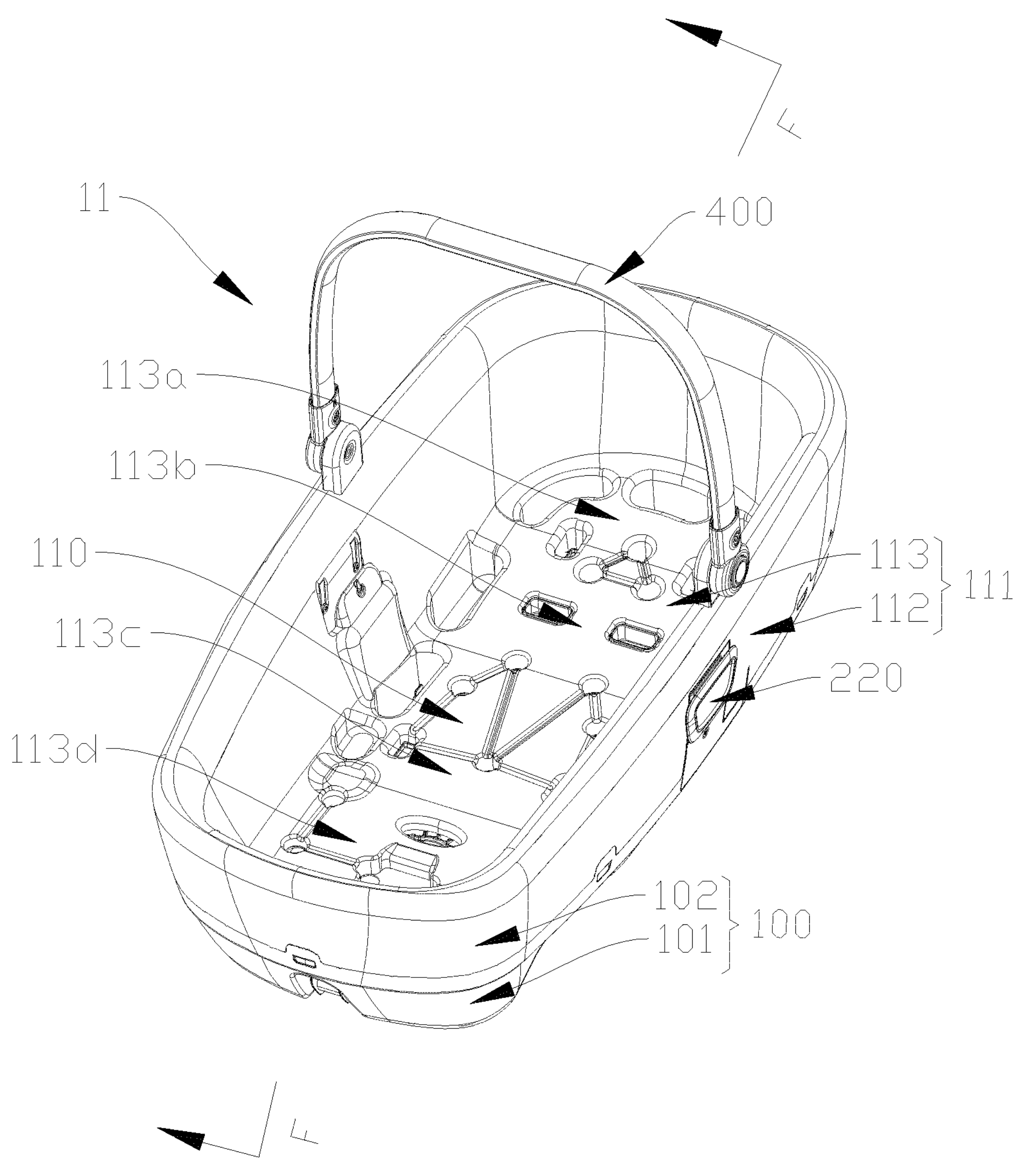
FIG. 16 is a perspective view illustrating a baby carrier according to yet another embodiment of the present disclosure, where the baby carrier is a carrycot.
Figure 17:
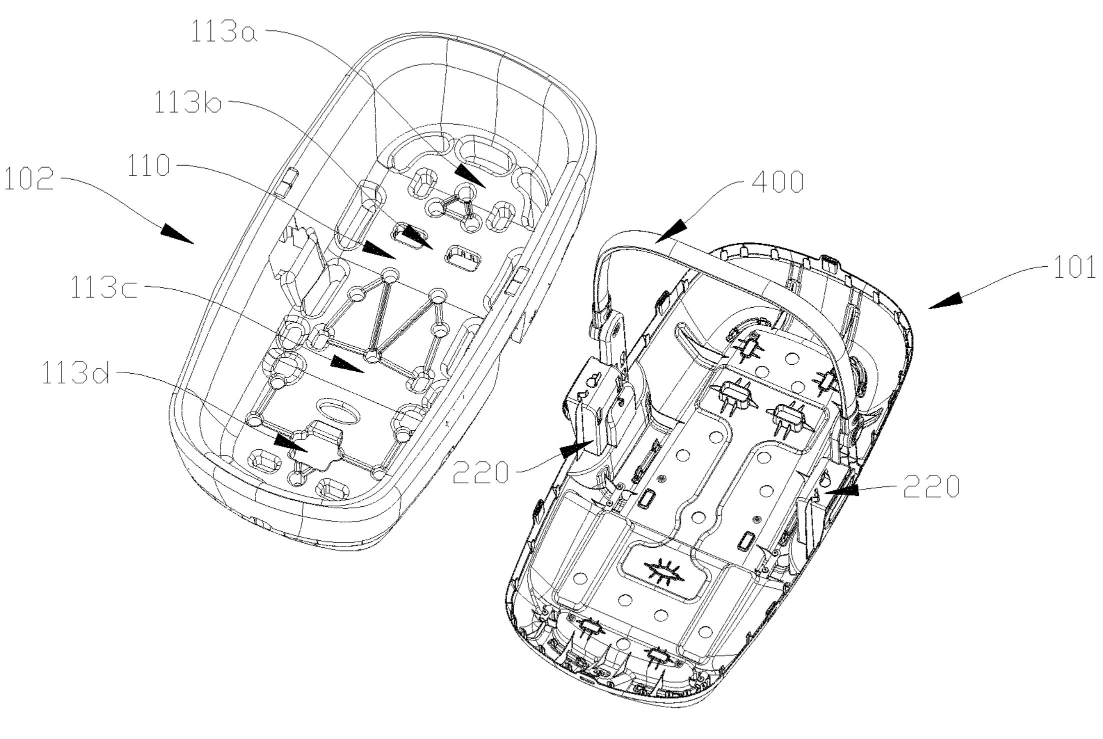
FIG. 17 is an explosion view of the baby carrier shown in FIG. 16.

As shown in FIGS. 14 to 15, the baby carrier may also be an infant car seat 12. The infant car seat 12 in this embodiment as shown in FIGS. 14 to 15 has a structure substantially the same as the carrycot 11 in the above mentioned embodiment shown in FIGS. 10 to 13, except that the bottom wall 113 of the infant car seat 12 includes a first support portion 113*e* and a second support portion 113*f* which are connected to each other and are arranged at a first included angle m (not shown in FIGS. 14 and 15, but may refer to FIG. 9), such that the baby can be in a sitting or half-lying position in the infant car seat 12. Optionally, the angle range of the first included angle m is from 90° to 135°, and in this embodiment, the first included angle m is 99°. A rounded transition is formed between the first support portion 113*e* and the second support portion 113*f* to match a shape of the baby's hips. In this way, a wrapping structure can be formed for the baby, such that the baby can be well protected, thereby providing a good impact resistance and improving the safety performance, and the baby will not be curled too much, ensuring the comfort of the baby. In addition, outer surfaces of the first support portion 113*e* and the second support portion 113*f* are provided with engaging rods 211, and the engaging rods 211 are disposed along a width direction of the first support portion 113*e* and a width direction of the second support portion 113*f* respectively. As shown in FIG. 27, the infant car seat 12 is generally engaged with and positioned on a base 20 of the child safety seat in a forward direction, that is, arranged longitudinally and in a direction parallel to a driving direction of a vehicle. A direction of the stress subjected by the infant car seat 12 is along the front-rear direction of the infant car seat 12, Therefore, the engaging rods 211 are arranged along a width direction of the first support portion 113*e* and a width direction of the second support portion 113*f* respectively.

The present disclosure also provides a manufacturing method for making the aforementioned baby carrier, including the following steps.

In step S201, a first mold is provided in which a connecting assembly 200 is placed.

In step S202, molten plastic is injected into a mould cavity of the first mold to enable the molten plastic to cover the connecting assembly 200, so as to form a main body 100, such that the connecting assembly 200 to be embedded and fixed in the main body 100.

The baby carrier made by the aforementioned manufacturing method is made of a plastic material as a whole, which is lighter and easier to move than the conventional composite structure of rigid plastic and soft foam materials. Besides, the baby carrier is made by secondary molding process to enable the connecting assembly 200 to be embedded and fixed in the main body 100 to form an integrated structure, which can ensure reliability of connection between the connecting assembly 200 and the main body 100, thereby ensuring stability of connection between the baby carrier and the child safety seat or the stroller.

In yet another embodiment, as shown in FIGS. 16 to 27, the baby carrier includes a first main body 101, a second main body 102, a connecting assembly 200 and a handle 400.

As shown in FIGS. 16 to 20, the baby carrier is a carrycot 11. The first main body 101 and/or the second main body 102 enclose a space for forming a carrying receptacle 110 configured to carry the baby. The carrying receptacle 110 is substantially a rectangular cavity. The second main body 102 is molded on the first main body 101. The carrying receptacle 110 has a receptacle wall 111, and the receptacle wall 111 includes four connected side walls 112 and a bottom wall 113 that are connected to the side walls 112. The bottom wall 113 includes a head support portion 113*a*, a back support portion 113*b*, a hip support portion 113*c* and a leg support portion 113*d* in sequence along a length direction of the bottom wall 113, which are configured to support the baby's head, back, hip and legs, respectively. The widths of the back support portion 113*b* and the hip support portion 113*c* each are greater than widths of the head support portion 113*a*, and the widths of the back support portion 113*b* and the hip support portion 113*c* each are greater than the width of the leg support portion 113*d*, that is, the bottom wall 113 forms a structure with narrow ends and a wide middle to fit the body structure of the baby whose shoulders and crotch are wider, making the baby more comfortable. In an alternative embodiment, the entire main body 100 may also be made into a structure that is narrow at both ends and wide in the middle, which can ensure a sufficient strength on the one hand, and facilitate processing and molding and reduce costs on the other hand. The shape of the main body 100 may be altered according to actual needs, and is not limited thereto. An inner surface of the bottom wall 113 may be arranged horizontally, such that the baby can lie flat in the carrycot 11, thus the function of the carrycot 11 is more stable, and also the baby will have a larger stretching space in the carrycot 11, which is beneficial for the baby to stretch and sleep in the carrycot 11. The inner surface of the bottom wall 113 may also be oblique to a certain extent, with an oblique angle not greater than 10°. In other words, an included angle between the inner surface of the bottom wall 113 and a horizontal plane is less than or equal to 10°.

Optionally, the main body 100 may be covered with a layer of flexible cover (not shown in the drawings), such as a fabric, to improve the comfort of the baby carrier. The carrying receptacle 110 has a receptacle wall 111, and the connecting assembly 200 is fixed on the receptacle wall 111.

The first main body 101 is made of a plastic material, the second main body 102 is made of a foam material, and the foam expansion ratio may be in a range from 30 to 50. If a sum of a volume of the first main body 101 and a volume of the second main body 102 is represented by V1, and the volume of the second main body 102 is represented by V2, V2/V1 is in a range from 0.89 to 0.99. The carrycot 11 made with this volume ratio can make the second main body 102, that is, the foam material, occupy the largest volume ratio in the overall structure under the premise of ensuring the support strength of the overall structure, which achieves a maximum light weight of the carrycot 11, thereby enabling the user to save effort when moving the carrycot 11 and improving the user's use experience.

As shown in FIGS. 16 to 20, the connecting assembly 200 is fixed on the receptacle wall 111. Specifically, the connecting assembly 200 includes an engaging member 210 and an adapter 220. The receptacle wall 111 includes side walls 112 and a bottom wall 113. The engaging member 210 is fixed on the outer surface of the bottom wall 113, and the engaging member 210 is configured to engage with a child safety seat. The adapter 220 is fixed on the outer surface of the side wall 112, and configured to engage with the stroller. An inner surface of the bottom wall 113 may be arranged horizontally, such that the baby can lie flat in the carrycot 11, thus the function of the carrycot 11 is more stable, and also the baby will have a larger stretching space in the carrycot 11, which is beneficial for the baby to stretch and sleep in the carrycot 11. The inner surface of the bottom wall 113 may also be oblique to a certain extent, with an oblique angle not greater than 10°.

Figure 18:
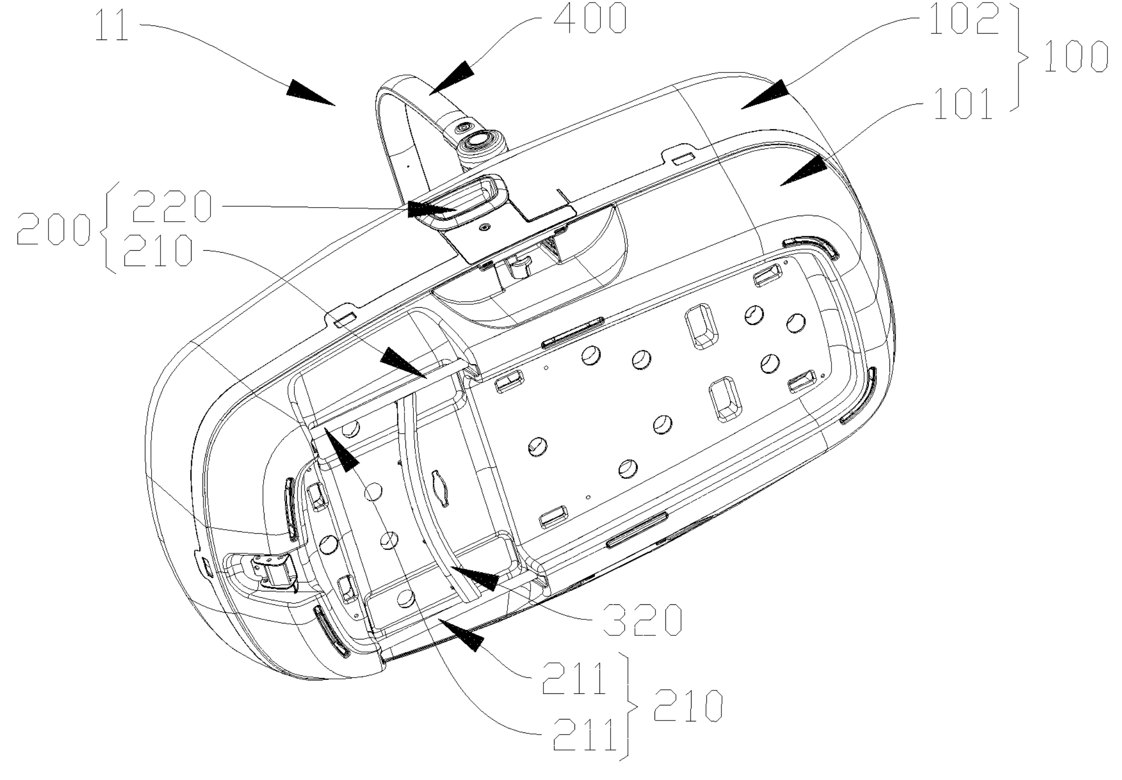
FIG. 18 is a perspective view illustrating the baby carrier shown in FIG. 16 in another perspective.
Figure 19:
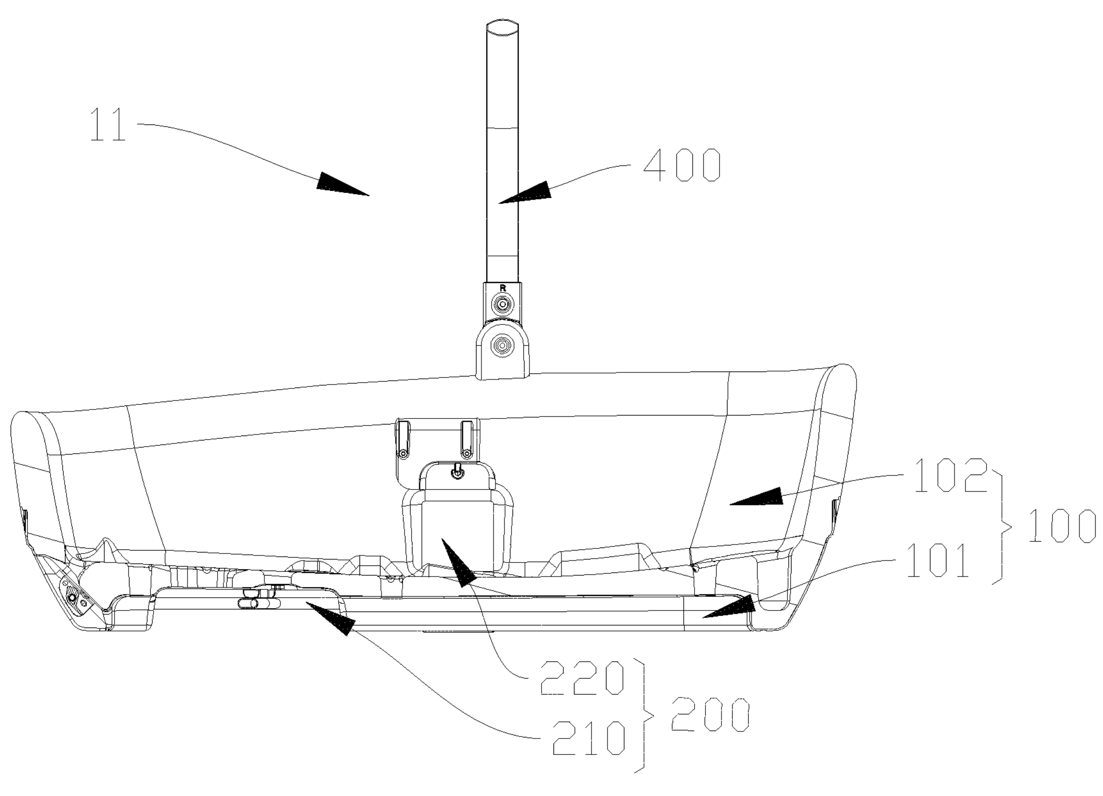
FIG. 19 is a sectional view along line F-F shown in FIG. 16.

Further, as shown in FIG. 18, the engaging member 210 includes two engaging rods 211, both of which are arranged along the length direction of the bottom wall 113, and the two engaging rods 211 are arranged parallel to each other and spaced apart. As shown in FIG. 20, the carrycot 11 is generally laterally engaged with and positioned on the base 20 of the child safety seat, and a direction of the impact subjected by the carrycot 11 is along a left-right direction of the carrycot 11, such that the two engaging rods 211 of the two engaging members 210 are arranged in parallel and spaced apart along the width direction of the bottom wall 113. In this embodiment, as shown in FIG. 12, both ends of the engaging rod 211 are fixed to the bottom wall 113 by fasteners 500. There are two adapters 220, and the two adapters 220 are fixed on the outer surfaces of the two opposite side walls 112 respectively. Of course, in other embodiments, the number and arrangement of the engaging rods 211 and the adapters 220 can also be adjusted according to the actual situation. Optionally, the adapter 220 includes an adapter body 221 and a release button 222 (not shown in FIG. 18, but may refer to the infant car seat 12 in FIG. 21). The adapter body 221 is configured to be engaged with a frame of the stroller, and the release button 222 is operable to release the adapter body 221 from the stroller.

Further, as shown in FIG. 18, two ends of the handle 400 are fixed on the two opposite side walls 112 respectively. In this embodiment, the two ends of the handle 400 are fixed on the two side walls 112 connected to length sides of the bottom wall 113, which is convenient for the user to lift the baby carrier. The handle 400 may be, for example, an annular webbing sewn on the fabric, or a cloth cover sewn on the fabric, and a soft or hard lifting loop may be provided in the cloth cover.

In this embodiment, a volume of the first main body 101 is $1.13\times10^{6}$ $mm^3$, and a volume of the second main body 102 is $1.84\times10^{7}$ $mm^3$. Therefore, V1 is $1.95\times10^{7}$ $mm^3$, V2 is $1.84\times10^{7}$ $mm^3$, and V2/V1 is 0.94. It is worth noting that the volume of the first main body 101 here does not include a volume of the connecting assembly 200 and the handle 400. In this embodiment, the sum of the volumes of the first main body 101 and the connecting component 200 is $1.31\times10^{6}$ $mm^3$. The volume of the first main body 101 and the volume of the second main body 102 can also be adjusted according to actual needs, as long as V2/V1 is kept within a range from 0.89 to 0.99.

As shown in FIGS. 21 to 27, the baby carrier is an infant car seat 12. The infant car seat 12 in this embodiment as shown in FIGS. 21 to 27 has a structure substantially the same as the carrycot 11 in the above mentioned embodiment shown in FIGS. 16 to 20, except that the bottom wall 113 of the infant car seat 12 includes a first support portion **113*e* and a second support portion 113*f* which are connected to each other and are arranged at a first included angle m, such that the baby can be in a sitting or half-lying position in the infant car seat 12. Optionally, the angle range of the first included angle m is from 90° to 135°, and in this embodiment, the first included angle m is 99°. A rounded transition is formed between the first support portion 113*e* and the second support portion 113*f* to match a shape of the baby's hips. In this way, a wrapping structure can be formed for the baby, such that the baby can be well protected, thereby providing a good impact resistance and improving the safety performance, and the baby will not be curled too much, ensuring the comfort of the baby. In addition, outer surfaces of the first support portion 113*e* and the second support portion 113*f* are provided with engaging rods 211, and the engaging rods 211 are disposed along a width direction of the first support portion 113*e* and a width direction of the second support portion 113*f* respectively. As shown in FIG. 27, the infant car seat 12 is generally engaged with and positioned on a base 20 of the child safety seat in a forward direction, that is, arranged longitudinally and in a direction parallel to a driving direction of a vehicle. A direction of the stress subjected by the infant car seat 12 is along the front-rear direction of the infant car seat 12, Therefore, the engaging rods 211 are arranged along a width direction of the first support portion 113*e* and a width direction of the second support portion 113*f*** respectively.

The first main body 101 is made of a plastic material, the second main body 102 is made of a foam material, and the foam expansion ratio may be in a range from 30 to 50. If a sum of a volume of the first main body 101 and a volume of the second main body 102 is represented by V1, and the volume of the second main body 102 is represented by V2, V2/V1 is in a range from 0.8 to 0.99. The infant car seat 12 made with this volume ratio can make the second main body 102, that is, the foam material, occupy the greatest volume ratio in the overall structure under the premise of ensuring the support strength of the overall structure, which achieves a maximum light weight of the infant car seat 12, thereby enabling the user to save effort when moving the infant car seat 12 and improving the user's use experience.

Figure 21:
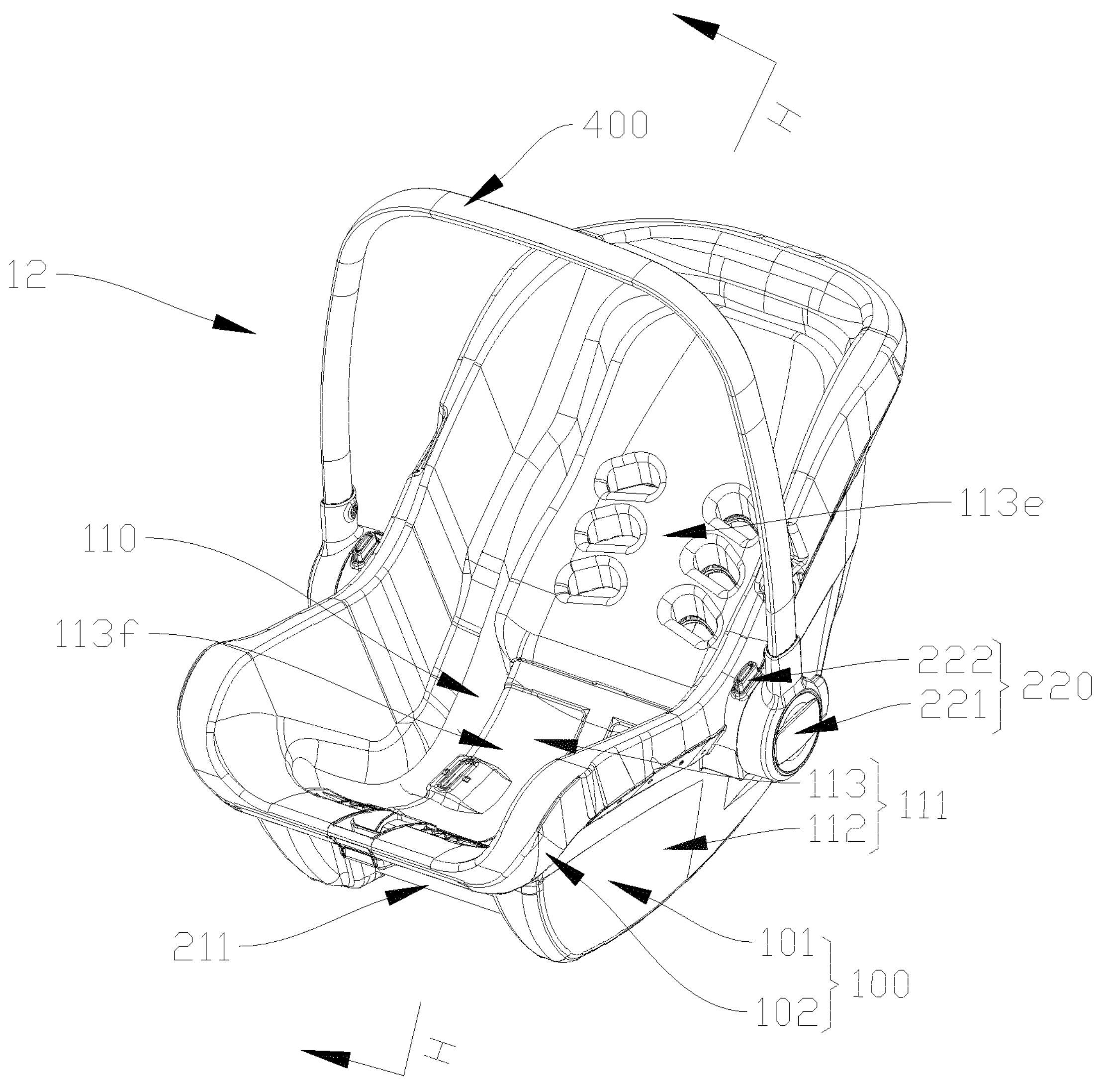
FIG. 21 is a perspective view illustrating a baby carrier according to yet another embodiment of the present disclosure, where the baby carrier is an infant car seat.
Figure 22:
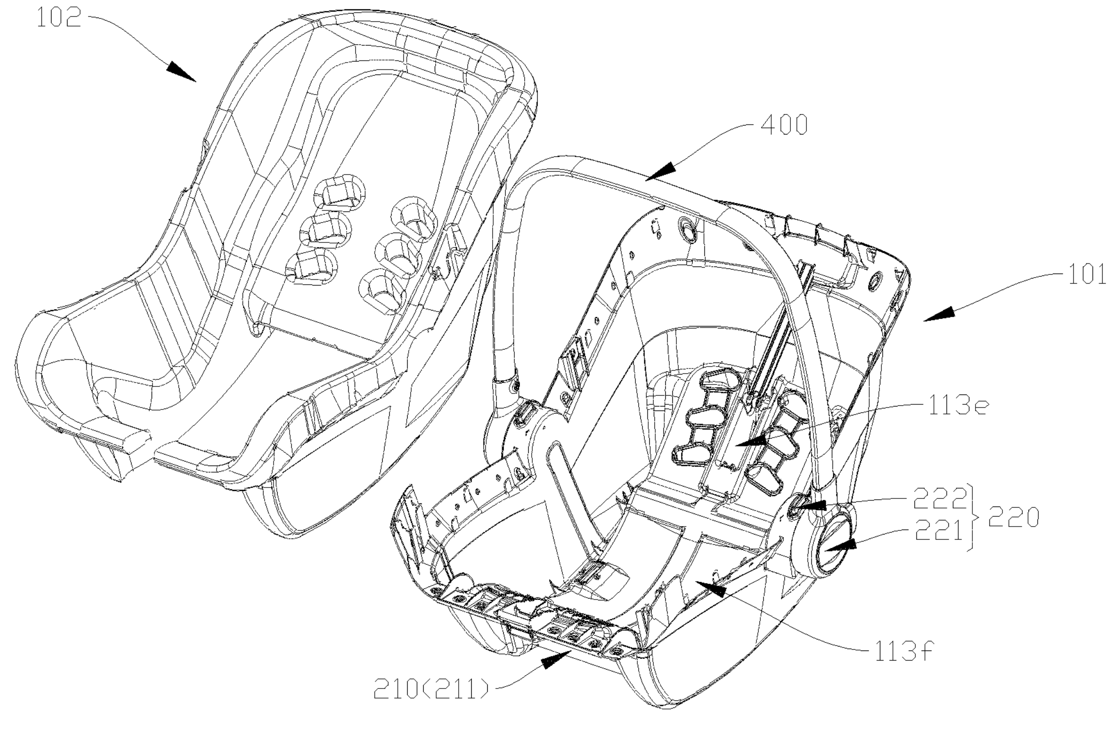
FIG. 22 is an explosion view of the baby carrier shown in FIG. 21.
Figure 23:
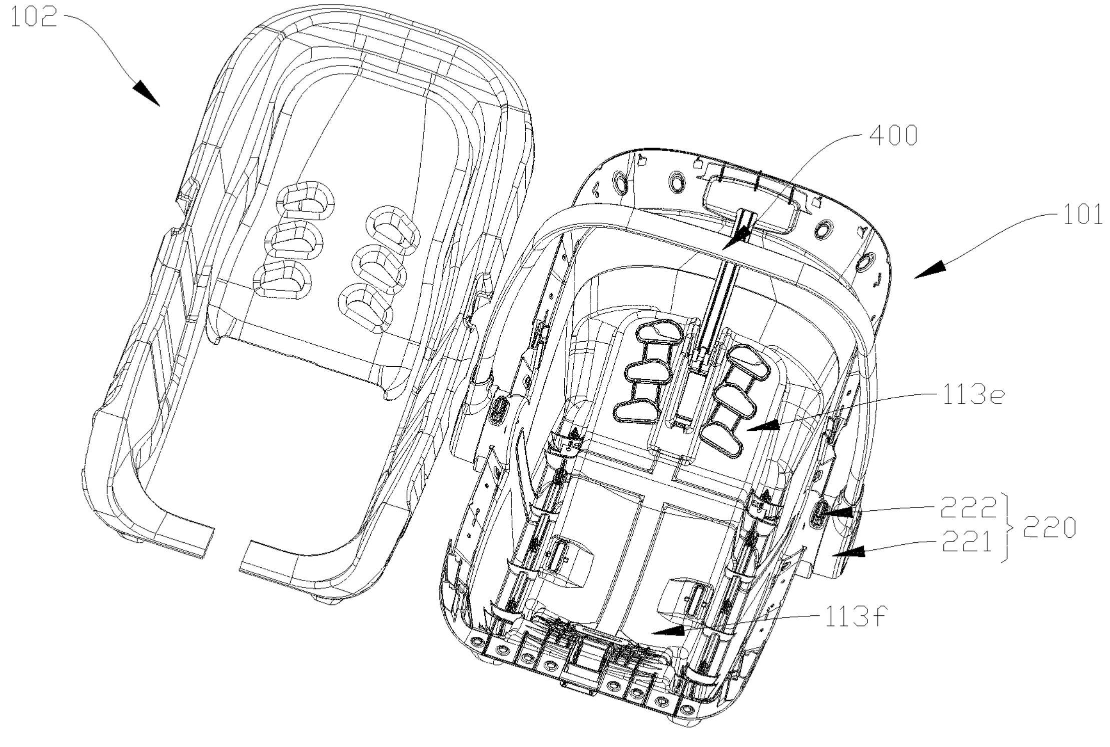
FIG. 23 is a perspective view illustrating the baby carrier shown in FIG. 22 in another perspective.
Figure 24:
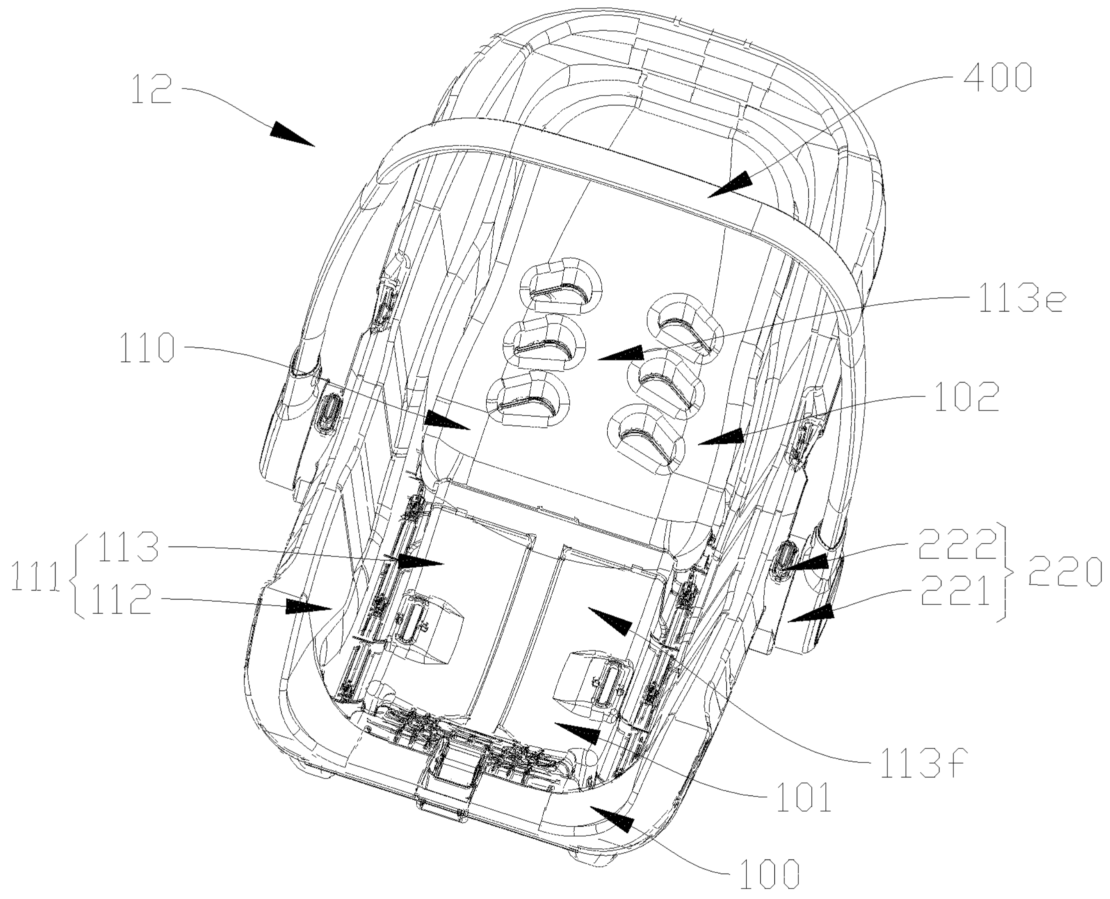
FIG. 24 is a perspective view illustrating the baby carrier shown in FIG. 21 in another perspective.

Further, as shown in FIGS. 21 to 23, the first support portion **113*e* is configured to support the baby's back, the connecting portion of the first support portion 113*e* and the second support portion 113*f* is configured to support the baby's hips, and the second support part 113*f* is configured to support the baby's legs. The second main body 102 only covers the first support portion 113*e*. According to a physical structure of the baby, in the infant car seat 12, the first support portion 113*e* is generally the main stress-subjected position, and the second support portion 113*f* is generally not subjected to too much stress. Therefore, the second main body 102 only covers the first support portion 113*e*, and does not cover the second support portion 113*f*, which can save the manufacturing cost and reduce the weight of the baby carrier 12 on the premise that the baby in the infant car seat 12 is adequately protected by buffering. The second main body 102 may also cover the first support portion 113*e* and the second support portion 113*f*** according to actual needs, which is not limited thereto.

Figure 25:
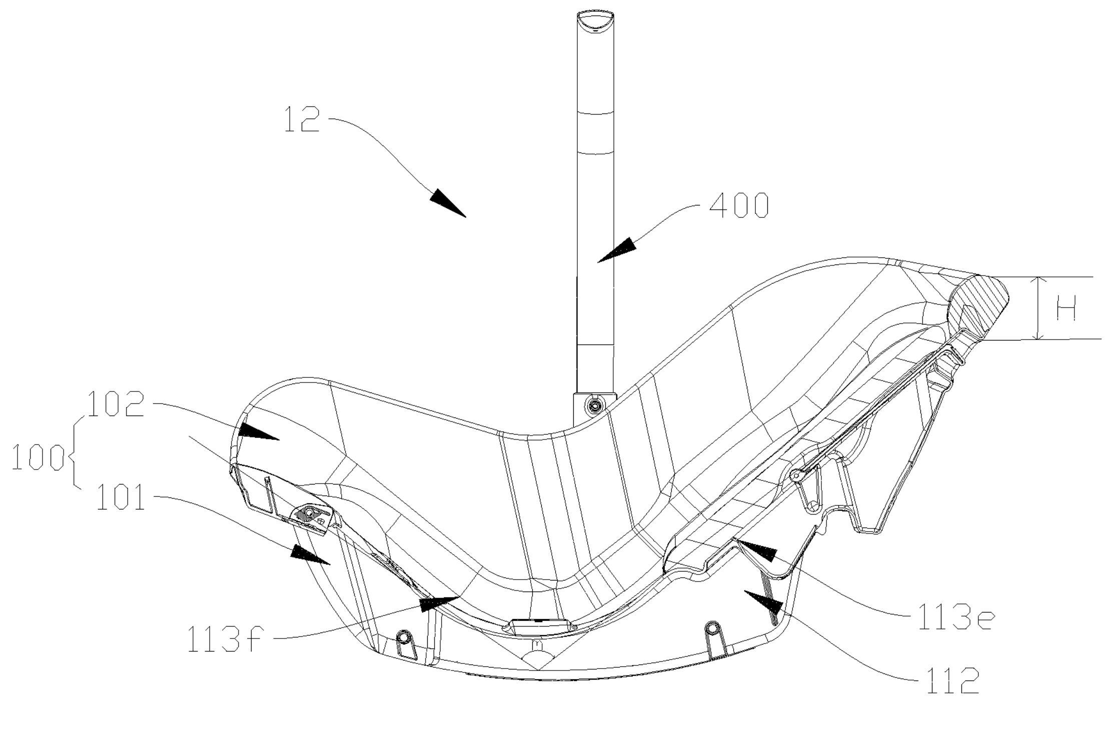
FIG. 25 is a sectional view along line H-H shown in FIG. 21.
Figure 26:
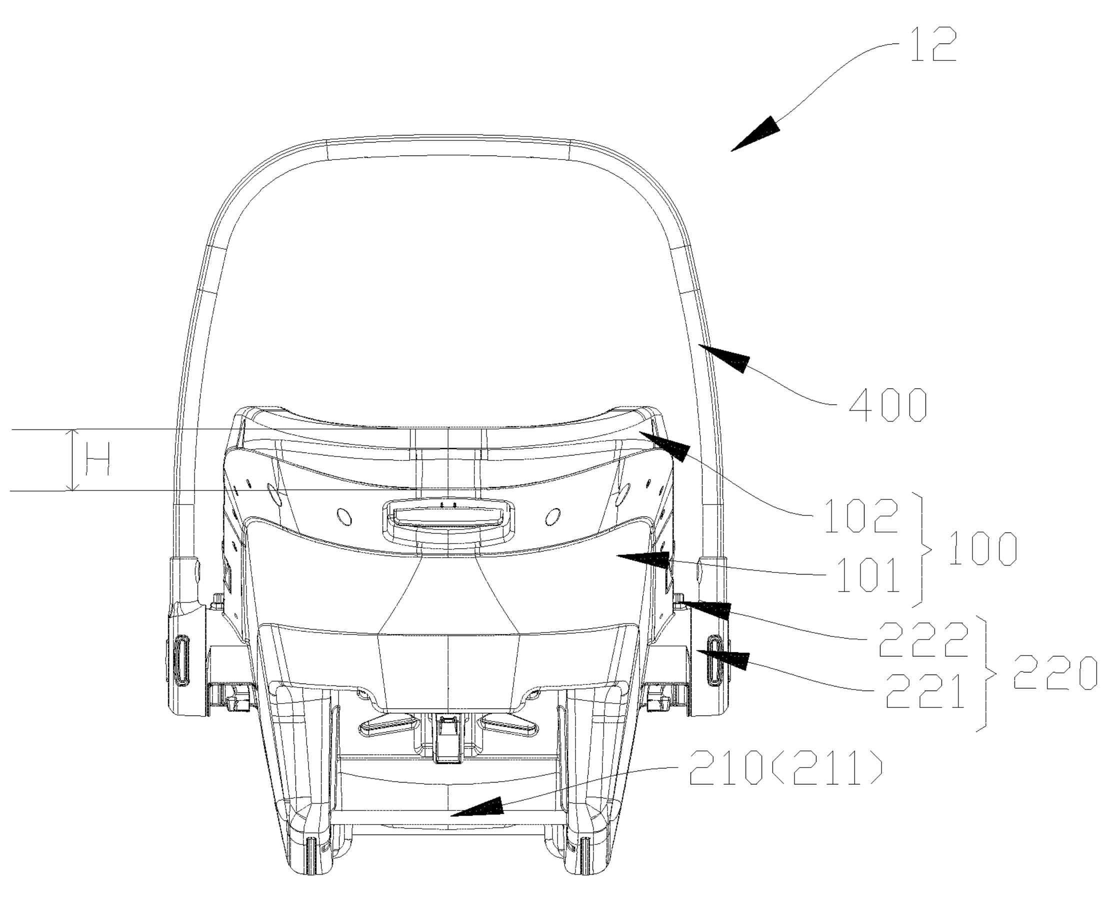
FIG. 26 is a perspective view illustrating the baby carrier shown in FIG. 21 in another perspective.

As shown in FIGS. 25 and 26, an end of the first support portion **113*e* away from the second support portion 113*f* is the headrest end, and an end of the second main body 102 close to the headrest end protrudes from an edge of the headrest end by a height H. In this way, when the infant car seat 12 is impacted by an external force, the baby's head can be prevented from colliding with the first main body 101** due to the baby's leaning back. Optionally, a range of H is from 40 to 50 mm. In this embodiment, H is 45 mm.

Further, removable buffer fillers (not shown in the drawings) can also be arranged around the infant car seat 12 to make the baby more comfortable, and these buffer fillers can be increased or decreased as required.

In this embodiment, a volume of the first main body 101 is $1.12\times10^{6}$ $mm^3$, and a volume of the second main body 102 is $6.25\times10^{7}$ $mm^3$. Therefore, V1 is $7.37\times10^{7}$ $mm^3$, V2 is $6.25\times10^{7}$ $mm^3$, and V2/V1 is 0.85. It is worth noting that the volume of the first main body 101 here does not include a volume of the connecting assembly 200 and the handle 400. In this embodiment, the sum of the volumes of the first main body 101 and the connecting component 200 is $1.22\times10^6$ $mm^3$. The volume of the second main body 102 here does not include a volume of the removable buffer filler, and a sum of the volume of the second main body 102 and the volume of the removable buffer filler is $8.27\times10^6$ $mm^3$. The volume of the first main body 101 and the volume of the second main body 102 can also be adjusted according to actual needs, as long as V2/V1 is kept within a range from 0.8 to 0.9.

The present disclosure also provides a manufacturing method for making the aforementioned baby carrier. The baby carrier is a carrycot 11. The manufacturing method includes the following steps.

In step S301, a first mold is provided, and a thermoplastic plastic is injected into a mould cavity of the first mold to form a first main body.

In step S302, a second mold is provided, the first main body is placed into a mould cavity of the second mold, and a foam material is injected into the mould cavity of the second mold to foam, such that the foam material is molded on the first main body to form a second main body, and if a sum of a volume of the first main body and a volume of the second main body is represented by V1, and the volume of the second main body is represented by V2, V2/V1 is in a range from 0.89 to 0.99.

In this way, the second main body 102 made of a foam material is molded on the first main body 101 made of a plastic material, and V2/V1 is in a range from 0.89 to 0.99. The carrycot 11 made with this volume ratio can make the second main body 102, that is, the foam material, occupy the greatest volume ratio in the overall structure under the premise of ensuring the support strength of the overall structure, which achieves a maximum light weight of the carrycot 11, thereby enabling the user to save effort when moving the carrycot 11 and improving the user's use experience.

Optionally, in step S302, the foam expansion ratio is in a range from 30 to 50.

A manufacturing method of a baby carrier is further provided according to the present disclosure. The baby carrier is an infant car seat, and the manufacturing method includes the following steps.

In step S401, a first mold is provided, and a thermoplastic plastic is injected into a mould cavity of the first mold to form a first main body.

In step S402, a second mold is provided, the first main body is placed into a mould cavity of the second mold, and a foam material is injected into the mould cavity of the second mold to foam, such that the foam material is molded on the first main body to form a second main body, and if a sum of a volume of the first main body and a volume of the second main body is represented by V1, and the volume of the second main body is represented by V2, V2/V1 is 0.8-0.9.

In this way, the second main body 102 made of a foam material is molded on the first main body 101 made of a plastic material, and V2/V1 is in a range from 0.89 to 0.99. The infant car seat 12 made with this volume ratio can make the second main body 102, that is, the foam material, occupy the greatest volume ratio in the overall structure under the premise of ensuring the support strength of the overall structure, which achieves a maximum light weight of the infant car seat 12, which enables the user to save effort when moving the infant car seat 12 and improves the user's use experience.

Optionally, in step S302, the foam expansion ratio is in a range from 30 to 50.

In the aforementioned baby carrier, the carrycot 11 or the infant car seat 12 made with the specific volume ratio can make the second main body 102, that is, the foam material, occupy the greatest volume ratio in the overall structure under the premise of ensuring the support strength of the overall structure, which achieves a maximum light weight of the carrycot 11 or the infant car seat 12, thereby enabling the user to save effort when moving the carrycot 11 or the infant car seat 12 and improving the user's use experience.

The technical features of the aforementioned embodiments can be combined arbitrarily. For the sake of brevity, not all possible combinations of the technical features in the aforementioned embodiments are described. However, all of the combinations of these technical features should be considered as within the scope of the present disclosure, as long as there is no contradiction in these combinations.

The aforementioned examples only represent several embodiments of the present disclosure, and the description thereof is specific and detailed, but should not be construed as a limitation on the scope of the invention patent. It should be noted that a plurality of variations and modifications may be made by those skilled in the art without departing from the scope of the present disclosure, which are all within the scope of protection of the present disclosure. Therefore, the protection scope of this invention shall be defined by the appended claims.

What is claimed is:

1. A baby carrier, comprising:
 - a main body formed with a carrying receptacle, the carrying receptacle being configured to carry a baby and having a receptacle wall; and
 - a connecting assembly fixed on the receptacle wall,
 - wherein the receptacle wall comprises side walls and a bottom wall, and the connecting assembly comprises:
 - an engaging member comprises an engaging rod fixed on an outer surface of the bottom wall and configured to engage with a child safety seat; and
 - an adapter fixed on an outer surface of a wall of the side walls and configured to engage with a stroller,
 - wherein the engaging member further comprises a connecting rod connected to the engaging rod and fixed on the adapter.

2. The baby carrier according to claim 1, wherein the baby carrier is a carrycot, and an end of the connecting rod away from the engaging rod is fixed on the adapter.

3. The baby carrier according to claim 1, wherein the connecting rod and the engaging rod are arranged at an included angle, and the connecting rod extends along a direction from the bottom wall to an opening of the carrying receptacle.

4. The baby carrier according to claim 3, further comprising a reinforcing member, wherein two engaging members are provided, the engaging rods of the two engaging members are parallel and spaced apart from each other, and two ends of the reinforcing member are connected to the two engaging rods respectively.

5. The baby carrier according to claim 4, wherein the adapter comprises a first adapter and a second adapter, and the first adapter and the second adapter are fixed on the outer surfaces of opposite walls of the side walls respectively, and ends of the connecting rods of the two engaging members away from the corresponding engaging rods are fixed on the first adapter and the second adapter, respectively.

6. The baby carrier according to claim 4, wherein the reinforcing member comprises a first reinforcing rod, and two ends of the first reinforcing rod are connected to ends of the two engaging rods away from the corresponding connecting rods respectively.

7. The baby carrier according to claim 6, wherein the first reinforcing rod and the two engaging rods are integrally formed.

8. The baby carrier according to claim 6, wherein the reinforcing member further comprises a second reinforcing rod, two ends of the second reinforcing rod are connected to the engaging rods of the two engaging members respectively, and the second reinforcing rod and the first reinforcing rod are spaced apart from each other.

9. The baby carrier according to claim 8, wherein the second reinforcing rod is a flat rod.

10. The baby carrier according to claim 3, wherein the engaging rod is partially embedded in the receptacle wall, and an exposed part of the engaging rod is spaced apart from the bottom wall of the receptacle wall.

11. The baby carrier according to claim 3, wherein the bottom wall comprises a head support portion, a back support portion and a hip support portion along a length direction of the bottom wall, and wherein the engaging rod extends from a connection between the engaging rod and the connecting rod in a direction away from the head support portion of the bottom wall.

12. The baby carrier according to claim 1, wherein an included angle between an inner surface of the bottom wall and a horizontal plane is less than or equal to 10°.

13. The baby carrier according to claim 1, wherein the baby carrier is an infant car seat, the bottom wall comprises a first support portion and a second support portion that are connected to each other, and the first support portion and the second support portion are arranged at a first included angle.

14. The baby carrier according to claim 13, wherein the first included angle is in a range from 90° to 135°.

15. The baby carrier according to claim 13, wherein a rounded transition is formed between the first support portion and the second support portion.

16. The baby carrier according to claim 13, wherein both an outer surface of the first support portion and an outer surface of the second support portion are provided with an engaging rod.

17. A method of manufacturing the baby carrier according to claim 1, the method of manufacturing comprising:

providing a mold in which the connecting assembly is placed; and injecting a foam material into a mold cavity of the mold to foam, so as to enable the foam material to form the main body in the mold, wherein the connecting assembly is fixed on the main body.

18. The method of manufacturing according to claim 17, wherein the main body covers a part of the connecting assembly.

19. A method of manufacturing the baby carrier according to claim 1, the method of manufacturing comprising:

providing a first mold in which the connecting assembly is placed; and injecting a molten plastic into a mold cavity of the first mold to enable the molten plastic to cover the connecting assembly to form the main body, such that the connecting assembly is embedded and fixed in the main body.

20. The baby carrier according to claim 1, wherein the main body comprises a first main body and a second main body, at least one of the first main body and the second main body is formed with the carrying receptacle, the first main body is made of a plastic material, the second main body is made of a foam material, and the second main body is molded on the first main body.

* * * * *